US008665261B1

(12) United States Patent
Baraff et al.

(10) Patent No.: US 8,665,261 B1
(45) Date of Patent: Mar. 4, 2014

(54) AUTOMATIC SPATIAL CORRESPONDENCE DISAMBIGUATION

(75) Inventors: David E. Baraff, Oakland, CA (US); Christine Waggoner, Berkeley, CA (US)

(73) Assignee: Pixar, Emeryville, CA (US)

(*) Notice: Subject to any disclaimer, the term of this patent is extended or adjusted under 35 U.S.C. 154(b) by 514 days.

(21) Appl. No.: 12/893,395

(22) Filed: Sep. 29, 2010

Related U.S. Application Data

(60) Provisional application No. 61/248,046, filed on Oct. 2, 2009.

(51) Int. Cl.
*G06T 15/00* (2011.01)

(52) U.S. Cl.
USPC ............ 345/419; 345/423; 345/428; 345/581; 345/582; 382/154

(58) Field of Classification Search
USPC ........... 345/419, 423, 428, 581, 582; 382/154
See application file for complete search history.

(56) References Cited

U.S. PATENT DOCUMENTS

| | | | |
|---|---|---|---|
| 6,940,505 | B1 | 9/2005 | Savine et al. |
| 7,138,999 | B2 | 11/2006 | Alliez et al. |
| 7,283,134 | B2 | 10/2007 | Hoppe |
| 7,538,769 | B2 | 5/2009 | Hoppe |
| 7,899,241 | B2 | 3/2011 | Baxes et al. |
| 8,237,710 | B1 | 8/2012 | Marketsmueller |
| 8,405,655 | B2 | 3/2013 | Onodera et al. |

OTHER PUBLICATIONS

Sifri et al, Geodesic-based surface remeshing, Proceedings, 12th International Meshing Roundtable, Sandia National Laboratories, pp. 189-199, Sep. 2003.*

Yan et al, Isotropic Remeshing with Fast and Exact Computation of Restricted Voronoi Diagram, Eurographics Symposium on Geometry Processing, 2009, pp. 1445-1454.*
Dong et al., Spectral Surface Quadrangulation, SIGGRAPH 06, ACM, Jul. 2006, pp. 1057-1066.
Alliez et al., Recent Advances in Remeshing of Surfaces, Aug. 31, 2009, pp. 1-31.
Desbrun et al., Instrinsic Parameterizations of Surface meshes, Eurographics 2002, vol. 21 (2), 2002, pp. 1-10.
Nguyen et al., "Geometry completion and detail generation by texture synthesis," The Visual Computer 21, 8-10 (2005): 669-678.
Schall et al., "Controlled filed generation for quad-meshing," Proceeding of the 2008 ACM Symposium on Solid and Physical Molding, ACM 2008.
Xu et al., Technical Section: Dynamic harmonic fields for surface processing, Computers and Graphics, Jun. 2009, vol. 33, No. 3, pp. 391-398.

* cited by examiner

*Primary Examiner* — Phu K Nguyen
(74) *Attorney, Agent, or Firm* — Kilpatrick Townsend & Stockton LLP

(57) ABSTRACT

An interactive multi-mesh modeling system may allow users to employ a variety of modeling techniques to interactively create one or more objects for a variety of different tasks or tools. The interactive multi-mesh modeling system may employ a variety of techniques for taking a source computer-generated representation of an object and providing the automatic creation, management, and maintenance of instances or versions of the source, and any information defined thereon or associated therewith, that are suitable for several different tasks. The interactive multi-mesh modeling system may further employ a variety of techniques for resolving ambiguities between various meshes based on establishing a correspondence between a first manifold and a second manifold based on a first metric of the first manifold, a second metric of the second manifold, and a third distinct metric of an embedding space.

21 Claims, 12 Drawing Sheets

AUTOMATIC SPATIAL CORRESPONDENCE DISAMBIGUATION

CROSS-REFERENCES TO RELATED APPLICATIONS

This Applicants claims priority to and the benefit of U.S. Patent Application No. 61/248,046, filed Oct. 2, 2009 and entitled "AUTOMATIC SPATIAL CORRESPONDENCE DISAMBIGUATION," the entire subject matter of which is herein incorporated by reference for all purposes.

This Application is related to the following commonly owned and co-pending applications:

U.S. patent application Ser. No. 12/893,319, filed Sep. 29, 2009 and entitled "Annotation-Based Mesh Modification" which claims priority to U.S. Provisional Patent Application No. 61/248,042, filed Oct. 2, 2009 and entitled "Automatic Annotation-Based Mesh Modification," both of which are hereby incorporated by reference for all purposes.

U.S. patent application Ser. No. 12/893,353, filed Sep. 29, 2009 and entitled "Structured Polygonal Mesh Retesselation" which claims priority to U.S. Provisional Patent Application No. 61/248,045, filed Oct. 2, 2009 and entitled "Structured Polygonal Mesh Retesselation," both of which are hereby incorporated by reference for all purposes.

U.S. patent application Ser. No. 12/893,431, filed Sep. 29, 2009 and entitled "Interactive Multi-Mesh Modeling System" which claims priority to U.S. Provisional Patent Application No. 61/248,050, filed Oct. 2, 2009 and entitled "Direct 3D Multiresolution Garment Modeling System," both of which are hereby incorporated by reference for all purposes.

U.S. patent application Ser. No. 12/893,460, filed Sep. 29, 2009 and entitled "Fractured Texture Coordinates" which claims priority to U.S. Provisional Patent Application No. 61/248,051, filed Oct. 2, 2009 and entitled "Fractured Texture Coordinates," both of which are hereby incorporated by reference for all purposes.

BACKGROUND

This disclosure relates to computer-generated imagery (CGI) and computer-aided animation. More specifically, this disclosure relates to an interactive multi-mesh modeling system and associated automatic spatial correspondence disambiguation techniques for use in CGI and computer-aided animation.

With the wide-spread availability of computers, computer graphics artists and animators can rely upon computers to assist in production process for creating animations and computer-generated imagery (CGI). This may include using computers to have physical models be represented by virtual models in computer memory. Typically, two-dimensional (2D) or three-dimensional (3D) computer-aided animation combines 2D/3D models of objects and programmed movement of one or more of the models. In 3D computer animation, the first step is typically the object modeling process. Objects can be sculpted much like real clay or plaster, working from general forms to specific details, for example, with various sculpting tools. Models may then be constructed, for example, out of geometrical vertices, faces, and edges in a 3D coordinate system to represent the objects. These virtual models can then be manipulated using computers to, for example, simulate physics, design aesthetic actions such as poses or other deformations, crate lighting, coloring and paint, or the like, of characters or other elements of a computer animation display.

Pixar is one of the pioneering companies in the computer-generated imagery (CGI) and computer-aided animation industry. Pixar is more widely known as Pixar Animation Studios, the creators of animated features such as "Toy Story" (1995) and "Toy Story 2" (1999), "A Bugs Life" (1998), "Monsters, Inc." (2001), "Finding Nemo" (2003), "The Incredibles" (2004), "Cars" (2006), "Ratatouille" (2007), and others. In addition to creating animated features, Pixar develops computing platforms and tools specially designed for computer-aided animation and CGI. One such example is now known as PhotoRealistic RenderMan, or PRMan for short. PRMan is a photorealistic RenderMan-compliant rendering software system based on the RenderMan Interface Specification (RISpec) which is Pixar's technical specification for a standard communications protocol (or interface) between 3D computer graphics programs and rendering programs. PRMan is produced by Pixar and used to render their in-house 3D animated movie productions. It is also available as a commercial product licensed to third parties, sold as part of a bundle called RenderMan Pro Server, a RenderMan-compliant rendering software system developed by Pixar based on their own interface specification. Other examples include tools and plug-ins for programs such as the AUTODESK MAYA high-end 3D computer graphics software package from AutoDesk, Inc. of San Rafael, Calif.

One core functional aspect of PRMan can include the use of a "rendering engine" to convert geometric and/or mathematical descriptions of objects into images. This process is known in the industry as "rendering." For movies, other animated features, shorts, and special effects, a user (e.g., a skilled computer graphics artist) can specify the geometric or mathematical description of objects to be used in the rendered image or animation sequence, such as characters, props, background, or the like. In some instances, the geometric description of the objects may include a number of animation control variables (avars) and values for the avars. An animator may also pose the objects within the image or sequence and specify motions and positions of the objects over time to create an animation.

As such, the production of CGI and computer-aided animation may involve the extensive use of various computer graphics techniques to produce a visually appealing image from the geometric description of an object that may be used to convey an essential element of a story or provide a desired special effect. One of the challenges in creating these visually appealing images is the can be the balancing of a desire for a highly-detailed image of a character or other object with the practical issues involved in allocating the resources (both human and computational) required to produce those visually appealing images.

Therefore, one issue with the production process is the time and effort involved when a user undertakes to model the geometric description of an object. One practice in computer animation can be to use multiple versions of the same geometric model according to a specific task. One might, for example, create and render a model for final display, but prefer to use a somewhat simplified model for other purposes, such as creating animation or performing simulation. However, it may take several hours to several days for a user to design, create, rig, pose, paint, or otherwise prepare a model that can be used to produce the visually desired look for one task. This involvement in time and effort can limit that ability of the user to create enough variants of the model for use in different stages of the production process or in a single scene to covey particular element of the story or to provide the desired visual effect. Additionally, artistic control over the look of a model or its visual effect when placed in a scene may also be lost by some attempts at reducing the time and effect in preparing a model that rely too much on automated procedural creation of models.

Accordingly, what is desired is to solve one or more of the problems relating to creating objects for use in CGI and computer-aided animation, some of which may be discussed herein. Additionally, what is desired is to reduce some of the drawbacks relating to creating objects for use in CGI and computer-aided animation, some of which may be discussed herein.

BRIEF SUMMARY

This disclosure relates to computer-generated imagery (CGI) and computer-aided animation. More specifically, this disclosure relates to an interactive multi-mesh garment modeling system and associated automatic spatial correspondence disambiguation techniques for use in CGI and computer-aided animation.

In various embodiments, an interactive multi-mesh modeling system may allow users to employ a variety of modeling techniques (e.g., solid modeling or shell/boundary modeling) to interactively create one or more computer-generated representations of objects (e.g., animated characters, static props, and objects whose motions are determined by computer simulations) for a variety of different tasks or tools associated with phases of modeling, layout and animation, and rendering. Some of these different tasks or tools can have requirements for the computer-generated representations of objects on which they operate. These requirements may differ from how some computer-generated representations were originally created (e.g., 3D solid objects output using solid modeling techniques vs. 2D flat "panel constructed" objects required for some computer simulations). Thus, the interactive multi-mesh modeling system may further employ a variety of techniques for taking a source computer-generated representation of an object and providing the automatic creation, management, and maintenance of instances or versions of the source, and any information defined thereon or associated therewith, that are suitable for several different tasks.

Accordingly, in one aspect, an interactive multi-mesh modeling system may automatically create and/or maintain one or more computer-generated representations of an object designated for each of a plurality of different tasks based on a source computer-generated representation of the object which may not be suitable to the requirements of some of the tasks. In another aspect, in maintaining each of the one or more computer-generated representations of the object designated for each of the plurality of different tasks, the interactive multi-mesh modeling system may automatically create and maintain correspondences between the source computer-generated representation of the object and any of the computer-generated representations of the object designated for the different tasks such that information defined on or otherwise associated with the source computer-generated representation of the object can be shared with or transferred to any of the other computer-generated representations of the object, and vice versa. In a further aspect, in maintaining each of the one or more computer-generated representations of the object designated for each of the plurality of different tasks, the interactive multi-mesh modeling system may automatically create and maintain correspondences between versions or iterations of computer-generated representations of the object that may be generated for the same task such that information defined on or otherwise associated with one computer-generated representation of the object used for the task can be shared with or transferred to any other computer-generated representation of the object for the same task, and vice versa. In a still further aspect, in maintaining each of the one or more computer-generated representations of the object designated for each of the plurality of different tasks, the interactive multi-mesh modeling system may automatically create and maintain correspondences between one of the computer-generated representations of the object designated for a first task and another computer-generated representations of the object designated for a second task such that information defined on or otherwise associated with one computer-generated representation of the object for one task can be shared with or transferred to another computer-generated representation of the object for another different task, and vice versa.

In one embodiment, a method for generating correspondences between objects can include receiving information specifying a first manifold endowed with a first metric. Information is also received specifying a second manifold endowed with a second metric. Information is further received specifying an embedding space that includes the first manifold and the second manifold. The embedding space has a third metric that is different or distinct from the first metric and the second metric. Information establishing a correspondence between the first manifold and the second manifold is generated based on the first metric, the second metric, and the third metric.

In some embodiments, receiving the information specifying the first manifold or receiving the information specifying the second manifold can include receiving information describing a 2D object. In some aspects, receiving the information specifying the embedding space that includes the first manifold and the second manifold can include receiving information describing a 3D space. In further aspects, the first metric, the second metric, or the third metric are defined according to at least one of Euclidean distance, geodesic distance, or topological distance.

In further aspects, generating the information establishing a correspondence between the first manifold and the second manifold based on the first metric, the second metric, and the third metric can include determining a plurality of points associated with a reference model representing potential correspondence candidates for a point associated with a driven model based on the third metric associated with the embedding space. A predetermined correspondence is then received between at least one point associated with the reference model and at least one point associated with the driven model based on the second metric associated with the second manifold. At least one point in the plurality of points associated with the reference model may be mapped to the point associated with the reference model based on the predetermined correspondence and the first metric.

In various embodiments, generating the information establishing a correspondence between the first manifold and the second manifold based on the first metric, the second metric, and the third metric can include receiving a known correspondence between at least one point associated with a reference model and at least one point associated with a driven model, the known correspondence satisfying metric criteria for the second metric. A point associated with the reference model that corresponds to a point associated with the driven model may be determined based on the known correspondence and ratios associated with a plurality of points associated with the reference model between the first metric and the third metric.

In a further embodiment, a non-transitory computer-readable medium stores computer-executable code for generating correspondences between objects. The computer-readable medium can include code for receiving information specifying a first manifold endowed with a first metric, code for receiving information specifying a second manifold endowed with a second metric, code for receiving information specifying an embedding space that includes the first manifold and the second manifold, the embedding space having a third metric different from the first metric and the second metric, and code for generating information establishing a correspondence between the first manifold and the second manifold based on the first metric, the second metric, and the third metric.

In still further embodiments, a system for generating correspondences between objects can include a processor and a memory in communication with the processor and configured to store a set of instructions which configure the processor to receive information specifying a first manifold endowed with a first metric, receive information specifying a second manifold endowed with a second metric, receive information specifying an embedding space that includes the first manifold and the second manifold, the embedding space having a third metric different from the first metric and the second metric, and generate information establishing a correspondence between the first manifold and the second manifold based on the first metric, the second metric, and the third metric.

A further understanding of the nature of and equivalents to the subject matter of this disclosure (as wells as any inherent or express advantages and improvements provided) should be realized by reference to the remaining portions of this disclosure, any accompanying drawings, and the claims in addition to the above section.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

DETAILED DESCRIPTION OF EXEMPLARY EMBODIMENTS

This disclosure relates to computer-generated imagery (CGI) and computer-aided animation. More specifically, this disclosure relates to an interactive multi-mesh modeling system and associated automatic spatial correspondence disambiguation techniques for use in CGI and computer-aided animation.

In various embodiments, an interactive multi-mesh modeling system may allow users to employ a variety of modeling techniques (e.g., solid modeling or shell/boundary modeling) to interactively create one or more computer-generated representations of objects (e.g., animated characters, static props, and objects whose motions are determined by computer simulations) for a variety of different tasks or tools associated with phases of modeling, layout and animation, and rendering. Some of these different tasks or tools can have requirements for the computer-generated representations of objects on which they operate. These requirements may differ from how some computer-generated representations were originally created (e.g., 3D solid objects output using solid modeling techniques vs. 2D flat "panel constructed" objects required for some computer simulations). Thus, the interactive multi-mesh modeling system may further employ a variety of techniques for taking a source computer-generated representation of an object and providing the automatic creation, management, and maintenance of instances or versions of the source, and any information defined thereon or associated therewith, that are suitable for several different tasks. The interactive multi-mesh modeling system may further employ a variety of techniques for resolving ambiguities between various meshes.

Introduction

Figure 1:
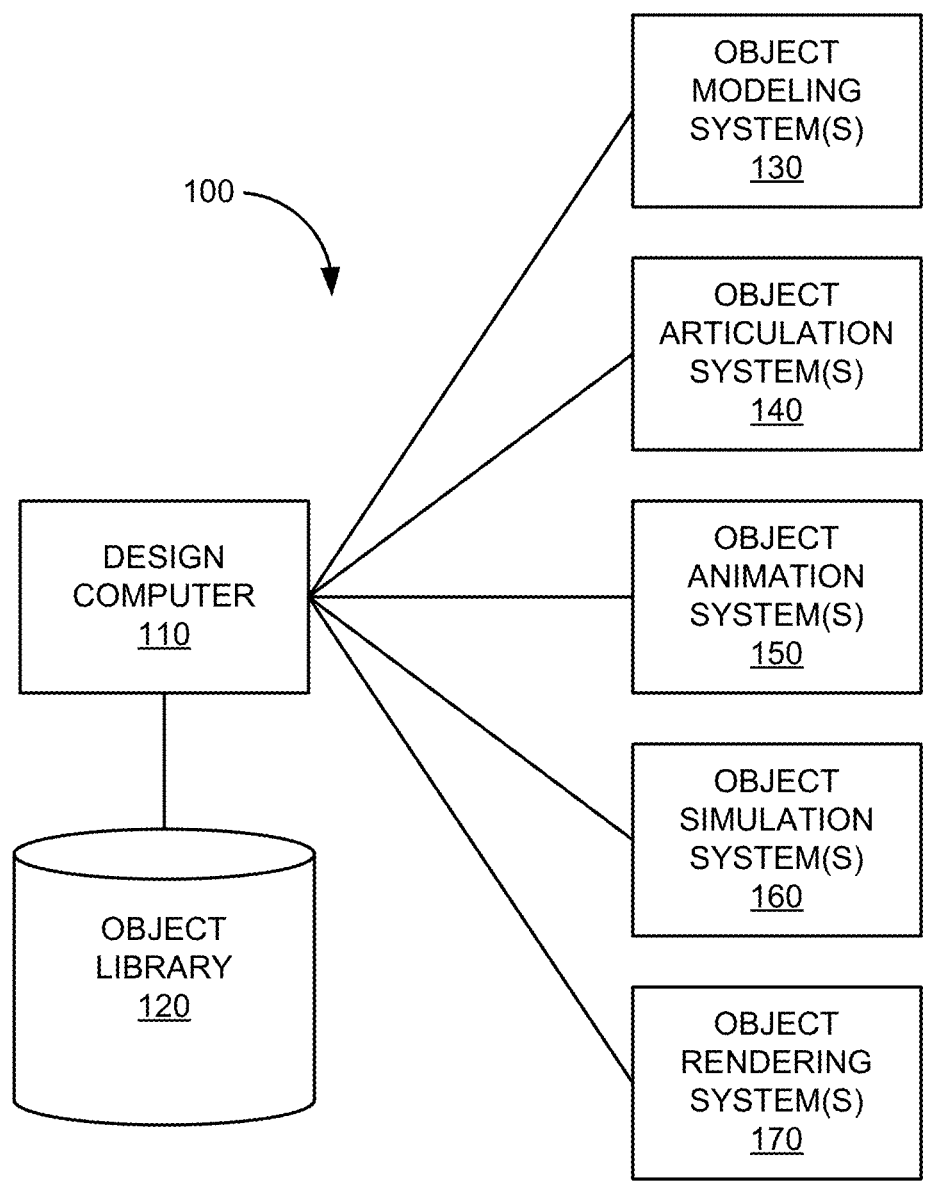
FIG. 1 is a simplified block diagram of a system for creating computer graphics imagery (CGI) and computer-aided animation that may implement or incorporate various embodiments or techniques disclosed herein.

FIG. 1 is a simplified block diagram of system 100 for creating computer graphics imagery (CGI) and computer-aided animation that may implement or incorporate various embodiments or techniques disclosed herein. FIG. 1 may merely be illustrative of an embodiment or implementation disclosed herein should not limit the scope of any invention as recited in the claims. One of ordinary skill in the art may recognize through this disclosure and the teachings presented herein other variations, generalities, modifications, and/or alternatives to those embodiments or implementations illustrated in FIG. 1. In this example, system 100 can include one or more design computers 110, one or more object libraries 120, one or more object modeler systems 130, one or more object articulation systems 140, one or more object animation systems 150, one or more object simulation systems 160, and one or more object rendering systems 170.

The one or more design computers 110 can include hardware and software elements configured for designing one or more computer-generated objects used in CGI and assisting with computer-aided animation. Each of the one or more design computers 110 may be embodied as a single computing device or a set of one or more computing devices. Some examples of computing devices are PCs, laptops, workstations, mainframes, cluster computing system, grid computing systems, cloud computing systems, embedded devices, computer graphics devices, gaming devices and consoles, consumer electronic devices having programmable processors, or the like. The one or more design computers 110 may be used at various stages of a production process (e.g., pre-production, designing, creating, editing, simulating, animating, rendering, post-production, etc.) to produce models of objects, computer-generated scenes, images, image sequences, animations, motion pictures, video, audio, or associated effects related to CGI and animation by employing one or more of object libraries 120 and/or systems 130-170 via various tools or interfaces.

The one or more object libraries 120 can include hardware and/or software elements configured for storing and accessing information related to one or more computer-generated objects. The information may be accessed by the one or more design computers 110 and/or systems 130-170 during various stages of a production process to produce CGI and animation. Some examples of the one or more object libraries 120 can include one or more file, one or more databases, or other storage devices and mechanisms. The one or more object libraries 120 may be locally accessible to the one or more design computers 110 and/or system 130-170 or hosted by one or more computer systems or storage devices externally accessible to the one or more design computers 110 and/or system 130-170.

Some examples of information stored in the one or more object libraries 120 can include information representing an object itself, metadata, object geometry, object topology, rigging, control data, animation data, animation cues, simulation data, texture data, lighting data, shader code, or the like. An object stored in the one or more object libraries 120 can include any entity that has an n-dimensional (e.g., 1D, 2D, or 3D) surface geometry. The shape of an object can include a set of points or locations in space (e.g., object space) that make up the object's surface. Topology of an object can include the connectivity of the surface of the object (e.g., the genus or number of holes in an object) or the vertex/edge/face connectivity of an object.

The one or more object modeling systems 130 can include hardware and/or software elements configured for modeling one or more computer-generated objects. The one or more object modeling systems 130 can be embodied as the one or more design computers 110 and/or software programs hosted by one or more computer systems. The one or more object modeling systems 130 may be invoked by or used directly by a user of the one or more design computers 110 and/or automatically invoked by or used by one or more processes associated with the one or more design computers 110. Some examples of software programs embodied as the one or more object modeling systems 130 can include commercially available high-end 3D computer graphics and 3D modeling software packages, such as 3D STUDIO MAX and AUTODESK MAYA produced by Autodesk, Inc. of San Rafael, Calif.

Modeling can include the creating, sculpting, and editing of an object. In various embodiments, the one or more object modeling systems 130 may be configured to generated a model to include a description of the shape of an object. The one or more object modeling systems 130 can be configured to facilitate the creation and/or editing of features, such as non-uniform rational B-splines or NURBS, polygons and subdivision surfaces (or SubDivs), that may be used to describe the shape of an object. In general, polygons are a widely used model medium due to their relative stability and functionality. Polygons can also act as the bridge between NURBS and SubDivs. NURBS are used mainly for their ready-smooth appearance and generally respond well to deformations. SubDivs are a combination of both NURBS and polygons representing a smooth surface via the specification of a coarser piecewise linear polygon mesh. A single object may have several different models that describe its shape.

The one or more object modeling systems 130 may further generate model data (e.g., 2D and 3D model data) for use by other elements of system 100 or that can be stored in the one or more object libraries 120. The one or more object modeling systems 130 may be configured to allow a user to associate additional information, metadata, color, lighting, rigging, controls, or the like, with all or a portion of the generated model data.

The one or more object articulation systems 140 can include hardware and/or software elements configured to articulating one or more computer-generated objects. The one or more object articulation systems 140 can be embodied as the one or more design computers 110 and/or software programs hosted by one or more computer systems. The one or more object articulation systems 140 may be invoked by or used directly by a user of the one or more design computers 110 and/or automatically invoked by or used by one or more processes associated with the one or more design computers 110. Some examples of software programs embodied as the one or more object articulation systems 140 can include commercially available high-end 3D computer graphics and 3D modeling software packages, such as 3D STUDIO MAX and AUTODESK MAYA produced by Autodesk, Inc. of San Rafael, Calif.

Articulation can include the building or creation of rigs, the rigging of an object, and the editing of rigging. In various embodiments, the one or more articulation systems 140 be configured to enable the specification of rigging for an object, such as for internal skeletal structures or eternal features, and to define how input motion deforms the object. One technique is called "skeletal animation," in which a character can be represented in at least two parts: a surface representation used to draw the character (called the skin) and a hierarchical set of bones used for animation (called the skeleton). Another technique involves the use of deformers in which a surface representation used to draw the character is deformed in response to one or more control structures that enclose the surface representation and whose manipulations drive the deformers.

The one or more object articulation systems 140 may further generate articulation data (e.g., data associated with controls or animations variables) for use by other elements of system 100 or that can be stored in the one or more object libraries 120. The one or more object articulation systems 140 may be configured to allow a user to associate additional information, metadata, color, lighting, rigging, controls, or the like, with all or a portion of the generated articulation data.

The one or more object animation systems 150 can include hardware and/or software elements configured for animating one or more computer-generated objects. The one or more object animation systems 150 can be embodied as the one or more design computers 110 and/or as software programs hosted by one or more computer systems. The one or more object animation systems 150 may be invoked by or used directly by a user of the one or more design computers 110 and/or automatically invoked by or used by one or more processes associated with the one or more design computers 110. Some examples of software programs embodied as the one or more object animation systems 150 can include commercially available high-end 3D computer graphics and 3D modeling software packages, such as 3D STUDIO MAX and AUTODESK MAYA produced by Autodesk, Inc. of San Rafael, Calif.

Animation can include the specification of motion and position of an object over time. In various embodiments, the one or more animation systems 150 may be configured to enable users to manipulate controls or animation variables or utilized character rigging to specify poses of object for one or more key frames of an animation sequence. The one or more animation systems 150 generate intermediary frames based on the one or more key frames. In some embodiments, the one or more animation systems 150 may be configured to enable users to specify animation cues, paths, or the like according to one or more predefined sequences. The one or more animation systems 150 generate frames of the animation based on the animation cues or paths. In further embodiments, the one or more animation systems 150 may be configured to enable users to define animations using one or more animation languages, morphs, deformations, or the like.

The one or more object animations systems 150 may further generate animation data (e.g., inputs associated with controls or animations variables) for use by other elements of system 100 or that can be stored in the one or more object libraries 120. The one or more object animations systems 150 may be configured to allow a user to associate additional information, metadata, color, lighting, rigging, controls, or the like, with all or a portion of the generated animation data.

The one or more object simulation systems 160 can include hardware and/or software elements configured for simulating one or more computer-generated objects. The one or more object simulation systems 160 can be embodied as the one or more design computers 110 and/or as software programs hosted by one or more computer systems. The one or more object simulation systems 160 may be invoked by or used directly by a user of the one or more design computers 110 and/or automatically invoked by or used by one or more processes associated with the one or more design computers 110. Some examples of software programs embodied as the one or more object simulation systems 160 can include physically-based numerical engines and commercially available high-end 3D computer graphics and 3D modeling software packages, such as 3D STUDIO MAX and AUTODESK MAYA produced by Autodesk, Inc. of San Rafael, Calif.

Simulation can include determining behavior, such as motion/position/collisions, of an object in response to one or more simulated forces, conditions, or other objects. In various embodiments, the one or more object simulation systems 160 may be configured to enable users to create, define, edit, or configure simulation engines, such as a physics engine or physics processing unit (PPU/GPGPU) using one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model. The one or more object simulation systems 160 may be used to simulate the behavior of objects, such as hair, fur, and cloth, in response to a physics model and/or animation of one or more characters and objects within a computer-generated scene.

The one or more object simulation systems 160 may further generate simulation data (e.g., motion and position of an object over time) for use by other elements of system 100 or that can be stored in the one or more object libraries 120. The generated simulation data may be combined with or used in addition to data generated by the systems 130-150. The one or more object simulation systems 160 may be configured to allow a user to associate additional information, metadata, color, lighting, rigging, controls, or the like, with all or a portion of the generated simulation data.

The one or more object rendering systems 170 can include hardware and/or software element configured for "rendering" or generating one or more images of one or more computer-generated objects. The one or more object rendering systems 170 can be embodied as the one or more design computers 110 and/or software programs hosted by one or more computer systems. The one or more object rendering systems 170 may be invoked by or used directly by a user of the one or more design computers 110 and/or automatically invoked by or used by one or more processes associated with the one or more design computers 110. One example of a software program embodied as the one or more object rendering systems 170 can include PhotoRealistic RenderMan, or PRMan, produced by Pixar Animations Studios of Emeryville, Calif.

"Rendering" can include generating an image from a model based on information such as geometry, viewpoint, texture, lighting, and shading information. In various embodiments, the one or more object rendering systems 170 can be configured to render one or more objects to produce one or more computer-generated images or a set of images over time that provide an animation. The one or more object rendering systems 170 may generate digital images or raster graphics images.

In various embodiments, a rendered image can be understood in terms of a number of visible features. Some examples of visible features that may be considered by the one or more object rendering systems 170 may include shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fogging/participating medium (e.g., techniques relating to how light dims when passing through non-clear atmosphere or air; shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency, diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlights on another object), depth of field (e.g., techniques relating to how objects appear blurry or out of focus when too far in front of or behind the object in focus), motion blur (e.g., techniques relating to how objects appear blurry due to high-speed motion, or the motion of the camera), non-photorealistic rendering (e.g., techniques relating to rendering of scenes in an artistic style, intended to look like a painting or drawing), or the like.

The one or more object rendering systems 170 may further render images (e.g., motion and position of an object over time) for use by other elements of system 100 or that can be stored in the one or more object libraries 120. The one or more object rendering systems 170 may be configured to allow a user to associate additional information or metadata with all or a portion of the rendered image. The one or more object rendering systems 170 may output information that can be encoded in various image and video formats, such as those related to JPG, PNG, MPG, MOV, H.264, or the like.

Interactive Multi-Mesh Modeling System

In various embodiments, system 100 may include one or more hardware elements and/or software elements, components, tools, or processes, embodied as the one or more design computers 110, object library 120, the one or more object modeler systems 130, the one or more object articulation systems 140, the one or more object animation systems 150, the one or more object simulation systems 160, and/or the one or more object rendering systems 170 that provide one or more tools for an interactive multi-mesh modeling system. In some aspects, a 3D model may be the sole authored data from which system 100 automatically creates and maintains other versions or representation of the 3D model suitable for a variety of specific tasks or task related tools, such as animation, simulation, and rendering. In further aspects, system 100 may automatically create and maintain correspondences (e.g., correspondence functions) between the 3D model and these other versions or representation of the 3D model facilitating the uni-directional or bi-directional transfer of information between meshes. In still further aspects, system 100 may automatically create and maintain correspondences between some of these other versions or representation of the 3D model facilitating the uni-directional or bi-directional transfer of information between meshes used for the same tasks and/or the transfer of information between meshes used in different tasks.

Figure 2:
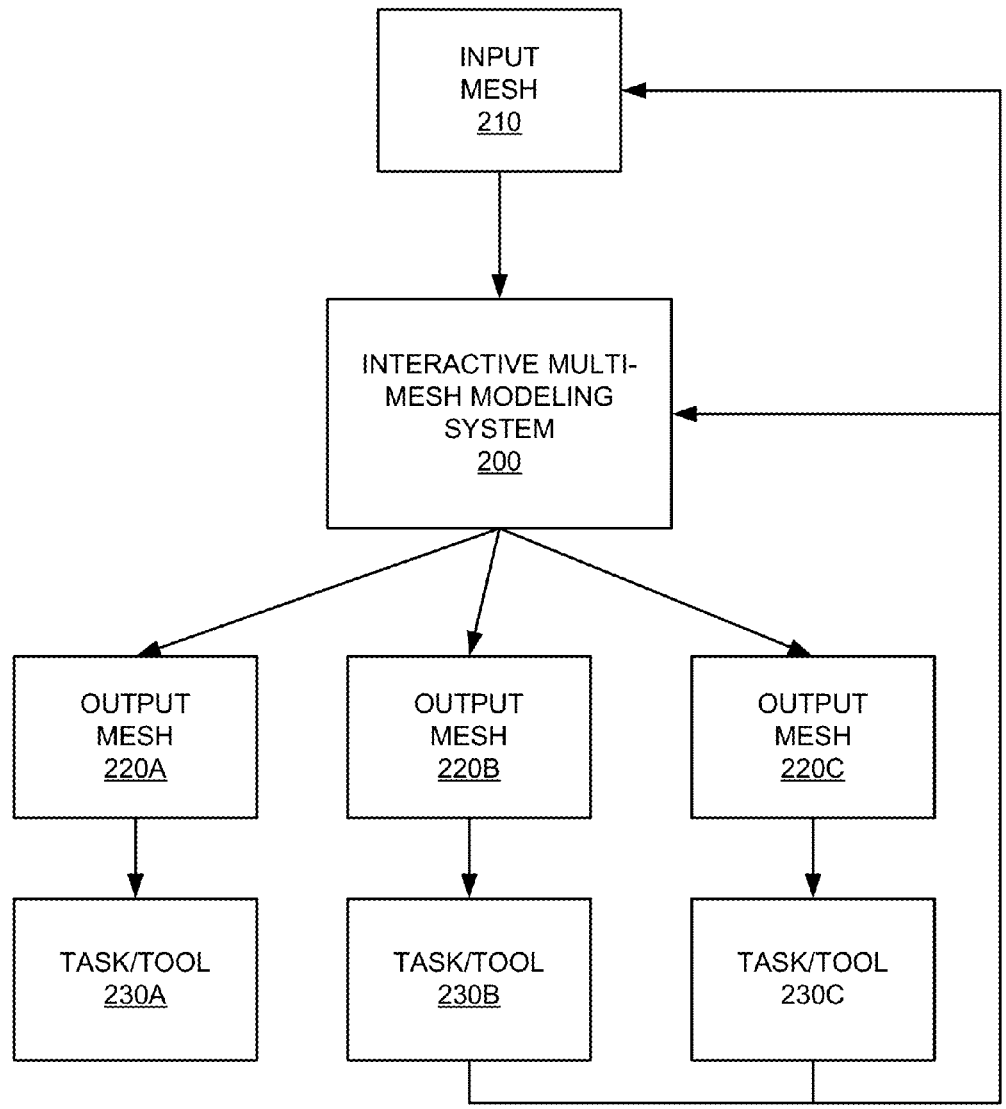
FIG. 2 is a simplified block diagram of an interactive multi-mesh modeling system in one embodiment for use in CGI and computer-aided animation.

FIG. 2 is a simplified block diagram of interactive multi-mesh modeling system 200 in one embodiment for use in CGI and computer-aided animation. Interactive multi-mesh modeling system 200 may be implemented by or otherwise incorporate elements of system 100 of FIG. 1. In various embodiments, interactive multi-mesh modeling system 200 allows a modeler to utilize, for example, solid 3D modeling tools and techniques to directly create, build, and edit one or more solid models of a variety of objects (e.g., input mesh 210). While this disclosure refers to garment objects and their associated modeling, animation, simulation, and rendering—the techniques disclosed herein may be applied to other others types or classes of objects for which multi-mesh management is desired for the same task or for different tasks.

In various embodiments, input mesh 210 may be associated with any model. Input mesh 210 may have any predetermined geometry, topology, complexity, resolution, or the like. Input mesh 210 further may be represented by any structures typically used to create computer-generated objects. Input mesh 210 may be associated with a model created using one or more 2D sketches that are swept along a path to become 3D. These may be cuts or extrusions for example. In another example, input mesh 210 may be associated with a model have one or more surfaces defined, trimmed, merged, or filled to make a solid object. In another example, input mesh 210 may include sufficient resolution to maintain a desired shape. In a further example, input mesh 210 may be associated with data, such as modeling, animation, simulation, or rendering data. Such data may be defined on input mesh 210 or otherwise associated with input mesh 210.

Figure 3:
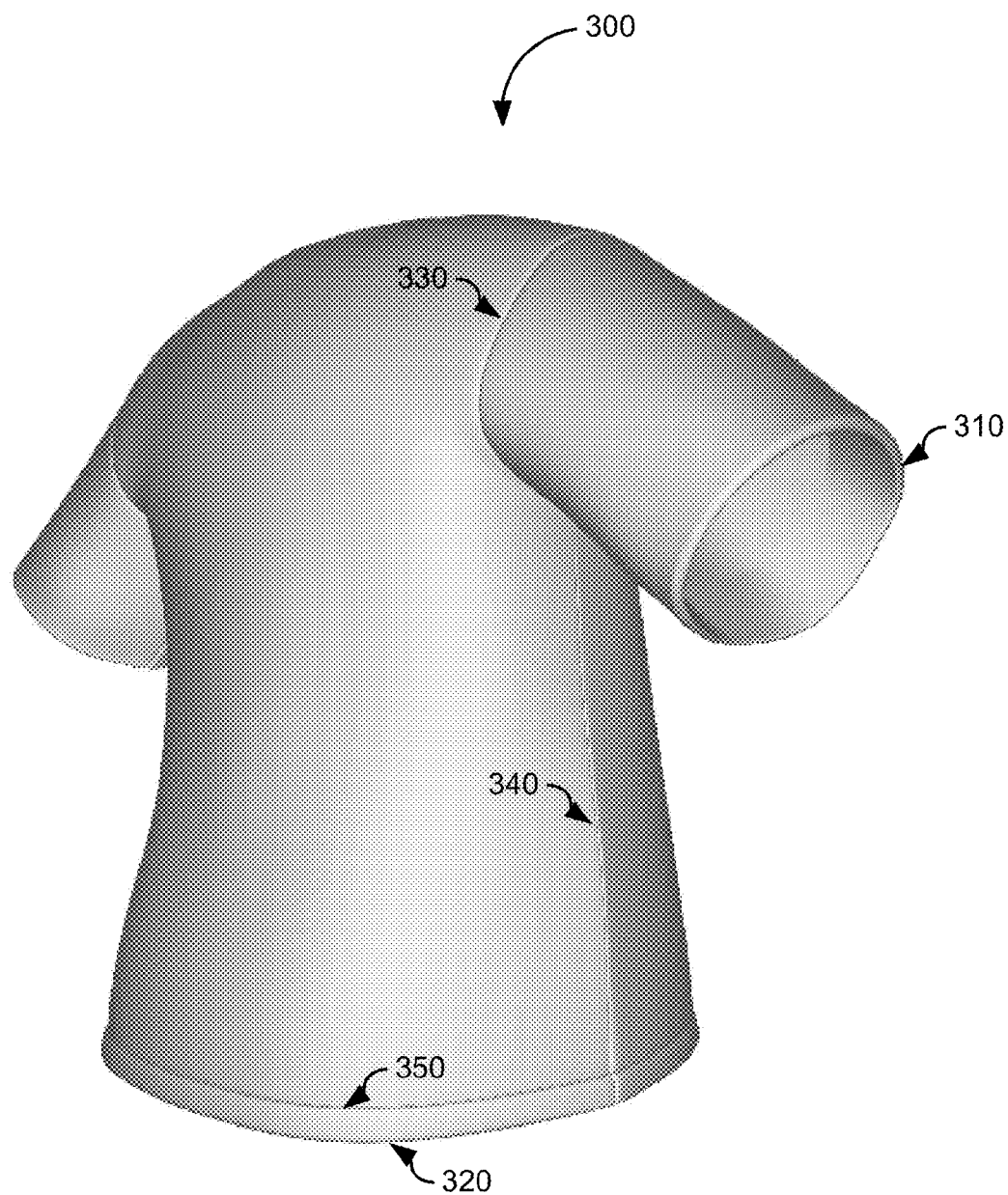
FIG. 3 depicts an image of a 3D model associated with a shirt object that may be used in one embodiment of the interactive multi-mesh modeling system of FIG. 2.

FIG. 3 depicts an image of 3D model 300 associated with a shirt object that may be used in one embodiment of interactive multi-mesh modeling system 200 of FIG. 2. Model 300 may be provided with enough detail or resolution that may be provided using conventional solid modeling techniques to express a desired shape as a shirt. In this example, FIG. 3 illustrates one or more features or details of model 300. In particular, model 300 has thickness 310 defined in and around the arm sleeves and thickness 320 defined in and around the bottom hem. Thickness 310 and 320 may be an effect of using solid modeling techniques to express the desired shape as a shirt. However, thickness 310 and 320 may be added to prevent the shape of model 300 from folding or bending as a static prop. Additionally, model 300 may include fine details, such as indentation details 330 defined to represent stitching and hemming at the top of an arm sleeve, indentation details 340 defined to represent stitching and hemming at the side seams, and indentation details 350 defined to represent stitching and hemming along the bottom hem.

Figure 4:
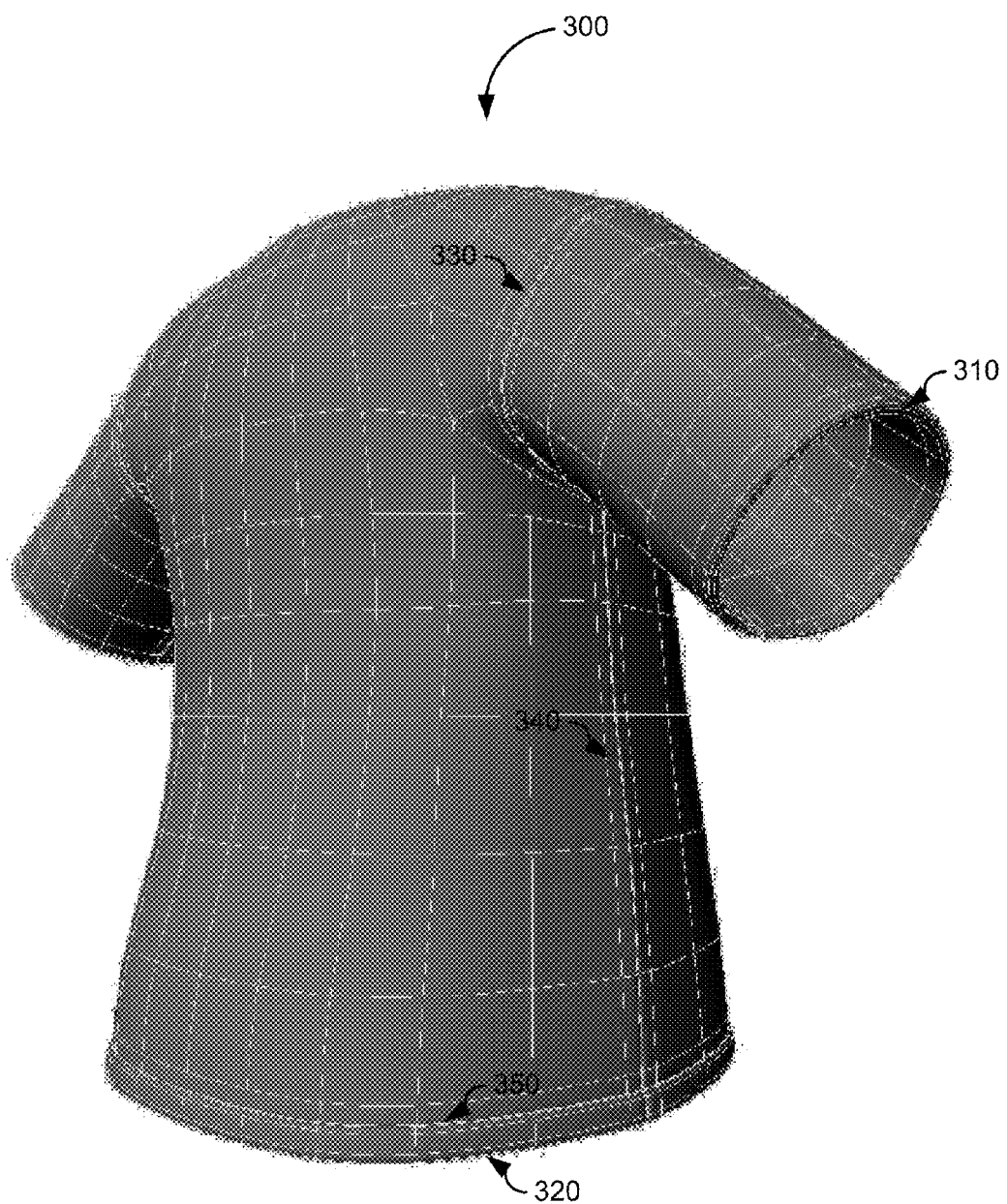
FIG. 4 depicts an image of the 3D model associated with the shirt object of FIG. 3 with underlying mesh structures that may be used in one embodiment of the interactive multi-mesh modeling system of FIG. 2.

FIG. 4 depicts an image of 3D model 300 associated with the shirt object of FIG. 3 with underlying mesh structures that may be used in one embodiment of interactive multi-mesh modeling system 200 of FIG. 2. In particular, model 300 may include a polygonal mesh having enough detail or resolution to express the desired shape as a shirt. In this example, FIG. 4 illustrates the above discussed features or details of model 300 and their corresponding underlying mesh structures. For example, model 300 may include one or more mesh structures for the thickness 310 define in the arm sleeves, one or more mesh structures for the thickness 320 defined along the bottom hem, and one or more mesh structures for the indentation details 330, 340, and 350.

At its current resolution or level of detail, model 300 may be use for display purposes or for rendering plausible images and animations. However, model 300 may not be directly suitable for other computer-generated graphics phases and tasks, such as simulation or photorealistic rendering. Traditionally, a modeler may have to manually create and maintain multiple versions of model 300 that may be used according to one or more different tasks. This can lead to several problems. For example, one problem with utilizing multiple versions of the same geometric model for different tasks is that during the design and authoring phase (i.e. when the model is initially being created and modified), it is unwieldy to force a modeler to build and maintain both a full model and the additional models needed to different tasks at the same time. This essentially compounds the amount of work required for every change to the full model that must be propagated to the different versions. In another example, garment models representing cloth traditionally have been modeling using flat panels that are stitched together. The skill set required to model cloth in this manner, however, may be different than the skill set of a typical 3D modeler or solid object modeler due to unfamiliarity with the requirements of computer simulations that rely on flat panel construction or varying user interfaces of different tool sets.

Accordingly, in various embodiments, interactive multi-mesh modeling system 200 may automatically create and maintain multiple instances or versions of input mesh 210 that may be used according to one or more different tasks. These automatically generated instances or versions may be completely independent of input mesh 210. Referring again to FIG. 2, interactive multi-mesh modeling system 200 may incorporate a variety of techniques that on demand or automatically reproduce or generate from a single mesh (e.g., input mesh 210) one or more additional meshes (e.g., output meshes 220) suitable for use in a variety of different tasks (e.g., tasks/tools 230), such as final rendering, animation, or simulation. Accordingly, each one of output meshes 220 may be used in a variety of workflows by workflow participants (e.g., users or processes/computers) in or during one of tasks 230 for which the output mesh was generated.

For example, interactive multi-mesh modeling system 200 may provide one or more user interfaces and tools that enable a user having a background in solid modeling to create any number of solid models that represent cloth or other garment objects. From these, interactive multi-mesh modeling system 200 can automatically create and maintain variant meshes each adapted for and suitable to a different task/tool of tasks/ tools 230. Some examples of the different tasks tools can include modeling tasks, layout and animation tasks, simulation tasks, and rendering tasks. Variation can also exist within a task/tool, such as different types of rendering tasks. These variant meshes can have a higher or lower resolution than the original, have more or less geometry than the original, have different topologies, be of different topological types, or the like. There can be many reasons for that the original solid models may not be suitable for these particular task, one being that there may be extra geometric complexity of a final solid model that can interfere in some manner with the animation process or introduce additional processing time. Thus, interactive multi-mesh modeling system 200 can automatically create and maintain separate meshes each adapted for and suitable to their different tasks.

Accordingly, interactive multi-mesh modeling system 200 may on demand and/or automatically generate and maintain output mesh 220A and enable output mesh 220A to be utilized in or by task 230A, which may including one or more rendering tasks or tools. Output mesh 220A may be automatically created to include or not include one or more user-specified or procedurally determined enhancements or features in geometry, topology, resolution, detail, or the like, that make output mesh 220A more suitable for task 230A. Interactive multi-mesh modeling system 200 may automatically create and maintain a correspondence (e.g., one or more correspondence functions) specifying the transfer of information defined on or otherwise associated with input mesh 210 to automatically generated output mesh 220A. Accordingly, in one aspect, interactive multi-mesh modeling system 200 may automatically create and maintain a more complex, higher resolution model from an original model of a garment object to be rendered for final display.

In various embodiments, interactive multi-mesh modeling system 200 may on demand and/or automatically generate and maintain output mesh 220B and enable output mesh 220B to be utilized in or by task 230B, which may include one or more animation tasks or tools. Output mesh 220B may be automatically created to include or not include one or more user-specified or procedurally determined enhancements or features in geometry, topology, resolution, detail, or the like, that make output mesh 220B more suitable for task 230B. Interactive multi-mesh modeling system 200 may automatically create and maintain a correspondence (e.g., one or more correspondence functions) specifying the transfer of information defined on or otherwise associated with input mesh 210 to automatically generated output mesh 220B. Accordingly, in another aspect, interactive multi-mesh modeling system 200 may automatically create and maintain a somewhat geometrically simplified model from the original model of a garment object to be used for creating animation data.

In various embodiments, interactive multi-mesh modeling system 200 may on demand and/or automatically generate and maintain output mesh 220C and enable output mesh 220C to be utilized in or by task 230C, which may include one or more simulation tasks or tools. Output mesh 220C may be automatically created to include or not include one or more user-specified or procedurally determined enhancements or features in geometry, topology, resolution, detail, or the like, that make output mesh 220C more suitable for task 230C. Interactive multi-mesh modeling system 200 may automatically create and maintain a correspondence (e.g., one or more correspondence functions) specifying the transfer of information defined on or otherwise associated with input mesh 210 to automatically generated output mesh 220C. Accordingly, in another aspect, interactive multi-mesh modeling system 200 may automatically create and maintain a model from the original model of a garment object to be used for creating simulation data.

As discussed above, interactive multi-mesh modeling system 200 may impart animation data, simulation data, rendering data, or other information defined on or otherwise associated with input mesh 210 to each of the automatically generated output meshes 220. As such, changes to input mesh 210 by a modeler (e.g., geometric changes) or modifications to information defined on or otherwise associated with input mesh 210 can be automatically utilized in selected ones of tasks 230 as interactive multi-mesh modeling system 200 reflects such changes in the automatically generated output meshes 220.

In further embodiments, interactive multi-mesh modeling system 200 may impart animation data, simulation data, rendering data, or other information defined on or otherwise associated with one of the automatically generated output meshes 220 to another one of the automatically generated output meshes 220. For example, interactive multi-mesh modeling system 200 may transfer task data defined on a first model automatically created and maintained for use in a particular task to a second model subsequently used in the particular task as a replacement for first model due to changes to input mesh 210. Therefore, existing task data may be preserved from one version of a model to another used in the same tasks. In another example, may transfer task data defined one automatically created and maintained model used in a first task to another automatically created and maintained model used in a second task. Therefore, the results of first task may be transferred to the model used in the second tasks.

Figure 5:
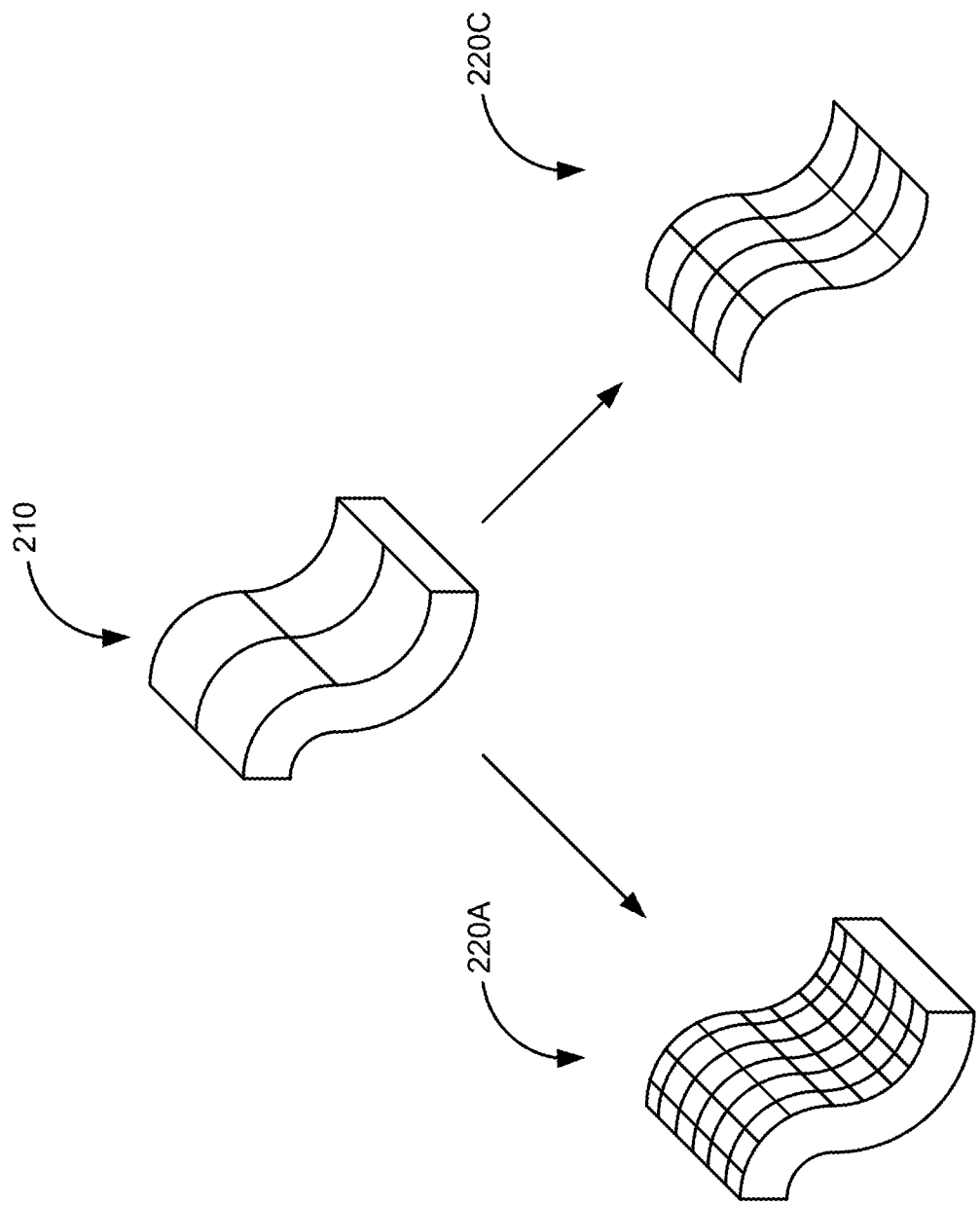
FIG. 5 illustrates selected aspects of multiple meshes managed by the interactive multi-mesh modeling system of FIG. 2 for the shirt object of FIG. 3 in one embodiment.

FIG. 5 illustrates selected aspects of aspects of multiple meshes managed by interactive multi-mesh modeling system 200 of FIG. 2 for the shirt object of FIG. 3 in one embodiment. In this example, input mesh 210 can be represented by an arbitrary solid polygonal mesh created using solid modeling techniques. Input mesh 210 can have a first resolution (represented by a first predetermined number of edges, vertices, and faces in FIG. 5). Interactive multi-mesh modeling system 200 may automatically generate output mesh 220A suitable for task 230A and automatically generate output mesh 220C suitable for task 230C.

Output mesh 220A can be represented by a solid polygonal mesh having a second resolution (represented by a second predetermined number of edges, vertices, and faces in FIG. 5). The second resolution can be greater than or less than the first resolution of input mesh 210. In this example, the number of edges, vertices, and faces for output mesh 220A in FIG. 5 is greater than the number of edges, vertices, and faces for input mesh 210. The second resolution may be determined based on requirements of a particular task. Accordingly, input mesh 210 may be upscaled or downscaled based on one or more specific task requirements.

Output mesh 220C can be represented by 2D polygonal mesh or flat panel having a third resolution (represented by a third predetermined number of edges, vertices, and faces in FIG. 5). The third resolution can be greater than or less than the first resolution of input mesh 210. Accordingly, in various embodiments, interactive multi-mesh modeling system 200 may automatically generate and maintain multiple meshes, each having different geometries, topologies, resolutions, or other aspects suited to requirements of their corresponding particular tasks. Thus, in various embodiments, interactive multi-mesh modeling system 200 facilitates and simplifies the construction of garment objects, some of which may be suitable for high-quality physical simulation and photorealistic rendering.

Figure 6:
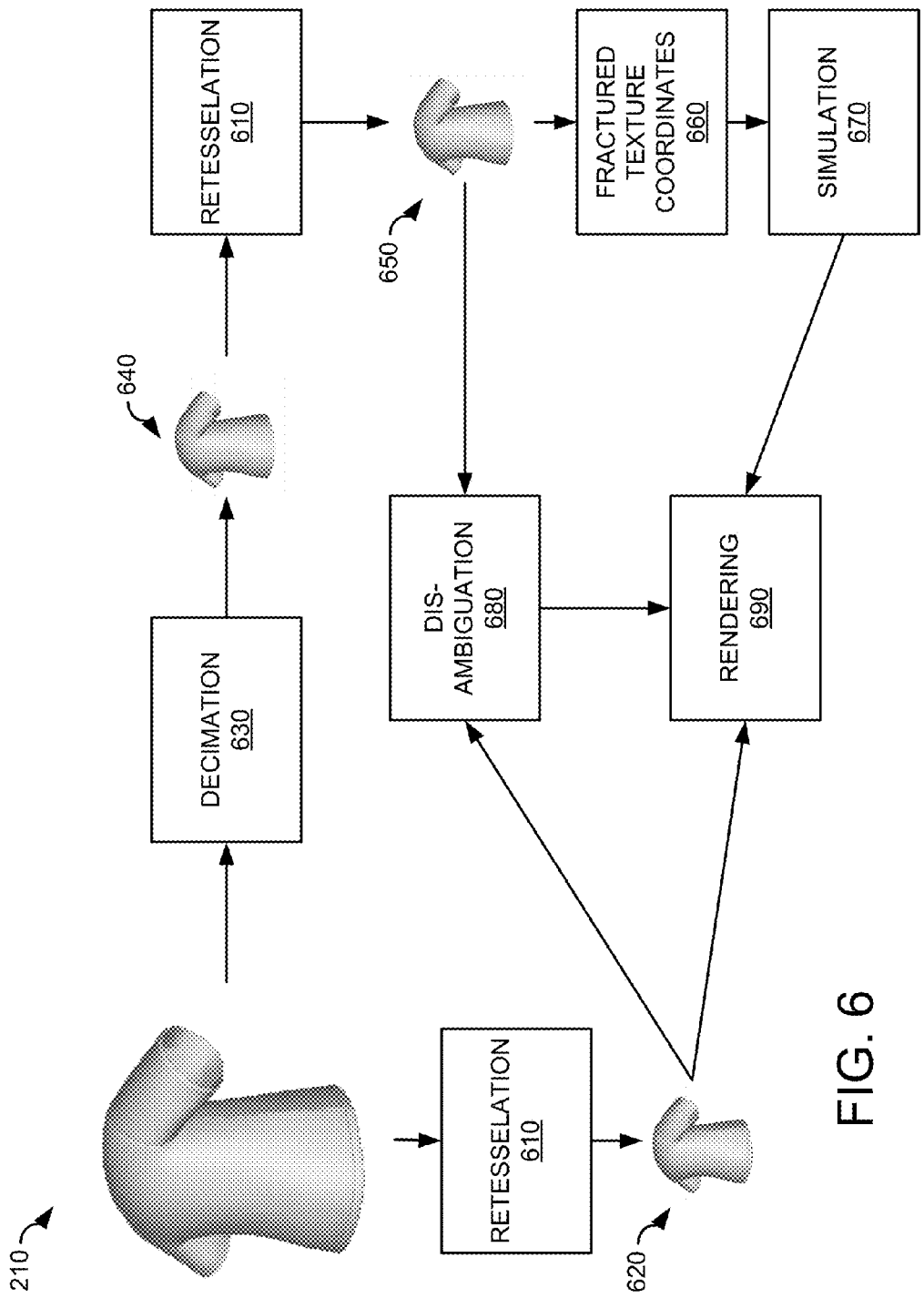
FIG. 6 is a simplified block diagram illustrating automatic multi-mesh management by the interactive multi-mesh modeling system of FIG. 2 for the shirt object of FIG. 3 in one embodiment.

FIG. 6 is a simplified block diagram illustrating automatic multi-mesh management by interactive multi-mesh modeling system 200 of FIG. 2 for the shirt object of FIG. 3 in one embodiment. In various embodiments, input to interactive multi-mesh modeling system 200 can include a traditional 3D modeled mesh as discussed above with respect to input mesh 210. Input mesh 210 may have a relatively low polygon count that is sufficient to produce a desired shape. Input mesh 210 may be produced by any commercial modeling system. Based on an input mesh modeled using solid modeling techniques, for example, interactive multi-mesh modeling system 200 can automatically generate at least two new meshes. One mesh may be of a higher resolution and approximate the shape of the modeled mesh. The newly generated mesh may have a specific geometric regularity. The other mesh may also be of a different resolution (e.g., higher or lower) and approximate the shape of the modeled mesh. The newly crated mesh may also have a specific geometric regularity and may have one or more optional geometric simplifications that make the mesh more suitable for a particular task.

In various embodiments, input mesh 210 or other meshes utilized by interactive multi-mesh modeling system 200 may not necessarily be triangular or have a specific geometric regularity. Input mesh 210 may have one or more faces varying considerably in size. Additionally, input mesh 210 may not be in a proper form suitable, for example, for a garment simulation system or for a final rendering process. At least one process provided by interactive multi-mesh modeling system 200 for automatically producing or generating one or more meshes from an input mesh may include "retesselation." Retesselation refers to one or more techniques that produce a new mesh that closely approximates the shape of an original mesh. In various embodiments, interactive multi-mesh modeling system 200 may provide that the structure of the retesselated mesh is to be more regular.

For example, in retesselation phase 610, interactive multi-mesh modeling system 200 may prepare input mesh 210 for one or more rendering tasks by generating shirt model 620.

Shirt model 610 can be represented by a higher resolution mesh than input mesh 210 with a specific geometric regularity that is more suitable for rendering. In retesselation phase 610, interactive multi-mesh modeling system 200 may implement one or more techniques for taking input mesh 210 (e.g., having a 3D polygonal mesh) that may not necessarily be triangular and possibly having faces varying considerably in size, and producing a new triangular mesh that closely approximates the shape of the original. Interactive multi-mesh modeling system 200 may also prepare other models during retesselation phase 610 for other tasks, such as animation or simulation, by automatically generating meshes that are suitable to a task's particular requirements.

In various embodiments, input mesh 210 and other meshes utilized by interactive multi-mesh modeling system 200 may include extra geometric complexity that can interfere in some manner with one or more of tasks 230. At least one process provided by interactive multi-mesh modeling system 200 for automatically producing or generating one or more meshes from an input mesh may include "decimation." Decimation refers to one or more techniques that simplify or reduce the geometry and/or topology of a model. In other words, one or more geometric or topological simplifications may be made to a model to prepare the model in a format suitable for a particular task. For example, in decimation phase 630, interactive multi-mesh modeling system 200 may implement geometric, topological, or other changes resulting from adding, removing, or modifying vertices, faces, or edges of input mesh 210) to create another model (e.g., shirt model 640). For example, a flat "panel constructed" garment suitable for simulations may be generated based on input mesh 210.

In various embodiments, interactive multi-mesh modeling system 200 may be guided in decimation phase 630 using user input or automated feature determining techniques. For example, how input mesh 210 is to be decimated by interactive multi-mesh modeling system 200 may be specified using tags, annotations, or other metadata. In one example, one or more annotations may be defined by a user directly on input mesh 210 and/or added directly to the model. Interactive multi-mesh modeling system 200 may utilize existing techniques that differentiate features or elements of a mesh, such as coloring, as a source of one or more annotations used to decimate input mesh 210.

In further embodiments, input mesh 210 and other meshes utilized by interactive multi-mesh modeling system 200 may not be in an appropriate form for a particular tasks. At least one process provided by interactive multi-mesh modeling system 200 for automatically producing or generating one or more mesh from an input mesh may include the generation of "fracture texture coordinates." As discussed above, some computer simulations may assume a flat "panel constructed" garment input. The simulation systems may need to know the rest shape of an object to be simulated to determine how a model will react when it finds itself in a shape other than its rest shape. In some cases, including the simulation of cloth-like behavior, simulation results may use force response algorithms that require a two-dimensional parameterization of the surface with very particular characteristics. However, these 2D parameterizations may loose some important pieces of information from the 3D model. Accordingly, in various embodiments, in fractured texture coordinates phase 660, interactive multi-mesh modeling system 200 may transform a UV mapping associated with input mesh 210 to determine gradients of U and V each polygon in the UV mapping that are substantially orthogonal and of uniform magnitude and that approximate the original gradients of U and V for the polygon. In fractured texture coordinates phase 660, interactive multi-mesh modeling system 200 may reshape individual polygons in the UV mapping based on the 3D representation of input mesh 210.

Interactive multi-mesh modeling system 200 may also ensure that the measurement directions between neighboring polygons are consistent.

In further embodiments, interactive multi-mesh modeling system 200 automatically maintains correspondences between input mesh 210 and other mesh utilized or created by interactive multi-mesh modeling system 200 and between the mesh utilized or created by interactive multi-mesh modeling system 200 themselves. At least one process provided by interactive multi-mesh modeling system 200 for automatically producing or generating one or more mesh from an input mesh and the maintenance of correspondences may include a disambiguation. Interactive multi-mesh modeling system 200 may resolve ambiguities in one or more associations or correspondences between objects, such between input mesh 210 and shirt model 620, between instances or version of shirt model 620, and between shirt model 620 and shirt model 650 providing that animation/simulation of shirt model 650 produces similar animation/simulation results of shirt model 620 in rendering phase 690.

For example, in disambiguation phase 680, interactive multi-mesh modeling system 200 may determine one or more correspondences or correspondence functions that specify the transfer of information between two meshes. Interactive multi-mesh modeling system 200 may implement one or more techniques that take any produced animation/simulation data for one model (e.g., shirt model 650 provided by simulation phase 670), and correlated it to model 620 such that shirt model 620 is placed in the same position, pose, etc. or otherwise exhibits that same behavior for rendering phase 690. In the absence of any predetermined correspondence between shirt model 620 and shirt model 650 as a reference model, one most common way of assigning each driven region to a reference region to follow is using what is known as spatial correspondence where one puts both the driven and the reference model in some default or "neutral pose" which are known to correspond, and then associates regions of the driven mesh with the region of the reference mesh they are closest to. However, most simple correspondence techniques fail when the driven model is fairly complex compared to the reference model. Accordingly, in various embodiments, in disambiguation phase 680, interactive multi-mesh modeling system 200 may implement one or more techniques for determining a spatial correspondence using a combination of metrics defined on the two meshes and a metric define on an embedding space. Some examples of metrics are Euclidean distance, geodesic distance, and topological distance.

In further embodiments, interactive multi-mesh modeling system 200 may enable the rendering of input mesh 210 or any of automatically generated output meshes 230 and associated task data in at least one rendering process provided by interactive multi-mesh modeling system 200 or connected to interactive multi-mesh modeling system 200. Interactive multi-mesh modeling system 200 may automatically generate shirt model 620 suitable for rendering and using one or more automatically generated associations or correspondences, transfer any modeling/animation/simulation or other task data from any one of input mesh 210 or other automatically generated shirt models to shirt model 620 in rendering phase 690.

Accordingly, in aspects of various embodiments, interactive multi-mesh modeling system 200 allows for interactive creation and design of a single 3D solid cloth model, for the authoring of animation data, simulation data (e.g., material characteristics), rendering data (e.g., shading/texture data), or the like, on the model or on one of multiple automatically generated version of the model that are suitable for a specific task, and for the automatic management and transferring of all or part of the authored data and results of these various tasks from the original model and between any automatically generated versions of the original model.

Automatic Spatial Correspondence Disambiguation

As discussed above, one practice in computer animation can be to use multiple versions of the same geometric model according to a specific task. Whatever the task, it is often necessary to produce animation data or simulation data for one geometric model, and then have a related geometric model undergo essentially the same deformations or motions. The version of the model being animated or simulated can be referred to as a "reference" model. The version of the other model (typically more complicated or having greater structural detail) can be referred to as a "driven" model. (It is not always the case that the driven model is the more complicated of the two). Accordingly, interactive multi-mesh modeling system 200 may automate workflows whereby a driven model "follows" a corresponding reference model, or, symmetrically, that a reference model "drives" a corresponding driven model.

Figure 7:
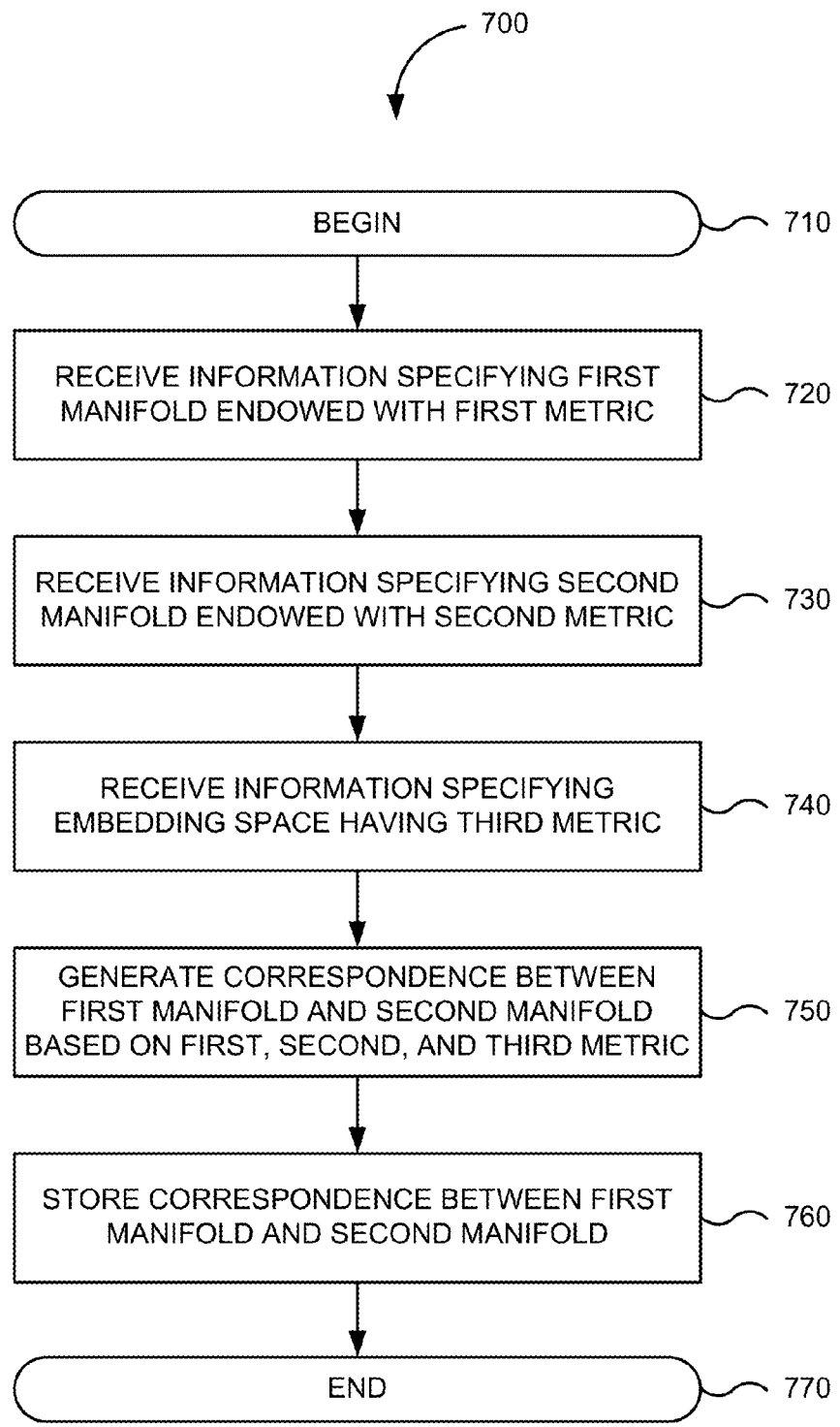
FIG. 7 is a simplified flowchart of a method for automatic spatial correspondence disambiguation in one embodiment of multi-resolution garment modeling for use in CGI and computer-aided animation.

FIG. 7 is a simplified flowchart of method 700 for automatic spatial correspondence disambiguation in one embodiment of multi-resolution garment modeling for use in CGI and computer-aided animation. The processing of method 700 depicted in FIG. 7 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 700 depicted in FIG. 7 begins in step 710.

In step 720, information specifying a first manifold endowed with a first metric is received. A manifold means a defined space. Some examples of manifolds include a space that is modeled on Euclidean space, topological manifolds (possibly with additional structure), differentiable manifolds, or the like. In one example, on a small enough scale a manifold may resemble the Euclidean space of a specific dimension, called the dimension of the manifold. Some examples of manifolds are a line and a circle which are one-dimensional manifolds, a plane and a sphere which are two-dimensional manifolds, or the like. Every point of an n-dimensional manifold can have a neighborhood homeomorphic to the n-dimensional space $R^n$.

In various embodiments, a manifold can be endowed with a metric. In one example, the metric can provide a distance function which defines a notion of distance between elements of a set. The notion of distance may include a measurement between two elements in some metric space such as a function $d(x,y)$ between elements x and y satisfy at least the property of positive definiteness. For example, a metric may provide for any two points in the space, a value equal to the distance between them. Some examples of distance between two points or elements of a manifold are Euclidean distance, geodesic distance, and topological distance. Euclidean distance (or Pythagorean metric) refers to the "ordinary" distance between two points in a space. Geodesic distance may refer to the distance between two vertices as the number of edges in a shortest path connecting the two vertices. In another example, a metric may provide for any three points in the space, an indication whether one point is closer to either one of the other points. The point may be closer using a reference to any distance between two points or elements of the manifold such as Euclidean distance, geodesic distance, or topological distance as discussed above. Accordingly, two metrics may be the same in that the notion of distance used is the same or that relative magnitude between two points is maintained (e.g., scale does not matter).

In step 730, information specifying a second manifold endowed with a second metric is received. The second manifold may be the same as the first manifold, substantially the same as the first manifold, slightly different from the first manifold, or substantially different from the first manifold. The second manifold may also be dimensionally different or distinct from the first manifold.

In step 740, information specifying an embedding space having a third metric is received. An embedding space means a space that embeds or otherwise includes the first manifold and the second manifold. For example, if the first manifold is an x-dimensional manifold and the second manifold is a y-dimensional manifold, then each manifold can be embedded in an (max[x,y])-dimensional embedding space (typically $R^3$). The third metric can be different from or distinct from the first and second metrics.

In step 740, a correspondence is generated between the first manifold and the second manifold based on the first metric, the second metric, and the third metric. A correspondence generated based on the first metric, the second metric, and the third metric provides a mapping between each element of the first manifold and a corresponding element of the second manifold. In various embodiments, a correspondence generated based on the first metric, the second metric, and the third metric allows one model (e.g., a reference model) to influence motion and position of another model (e.g., a driven model). In other words, interactive multi-mesh modeling system 200 may automatically determine how changes in the motion and position of one model specifically influence changes in the motion and position of another model.

In step 750, the correspondence is stored. Interactive multi-mesh modeling system 200 may use the stored correspondence to reflect changes in the motion and position of one model in the motion and position of another model. FIG. 7 ends in step 760.

Figure 8A:
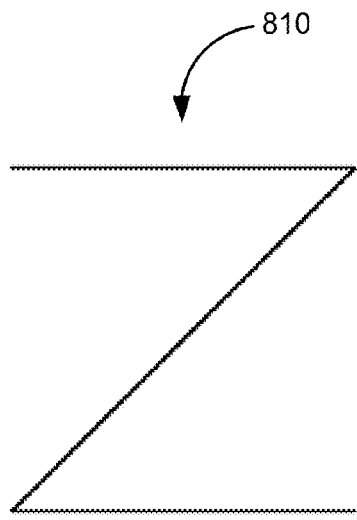
FIGS. 8A, 8B, 8C, and 8D show a reference model and a driven model in one embodiment.
Figure 8B:
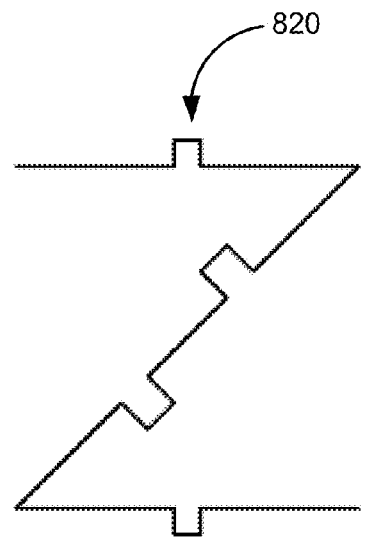
Figure 8C:
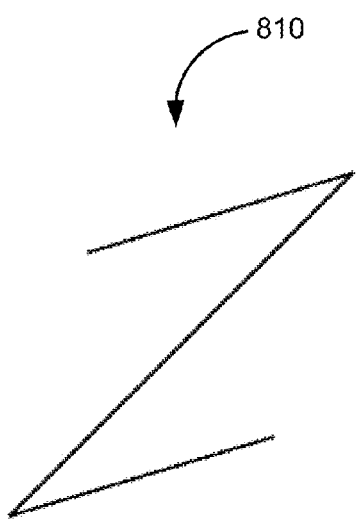
Figure 8D:
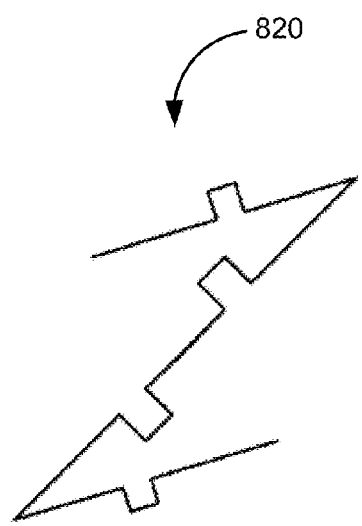

FIG. 8A shows reference model 810 in one embodiment. Reference model 810 may be though of as one of output meshes 220 tailored to a specific task, such as animation or simulation. Reference model 810 may be a simplified or decimated version of a corresponding driven model 820 shown in FIG. 8B in one embodiment. As reference model 810 is deformed as shown in FIG. 8C, interactive multi-mesh modeling system 200 may use an automatically determined correspondence between reference model 810 and driven model 820 to have driven model follow along with deformations to reference model 810 as shown in FIG. 8D.

Figure 9A:
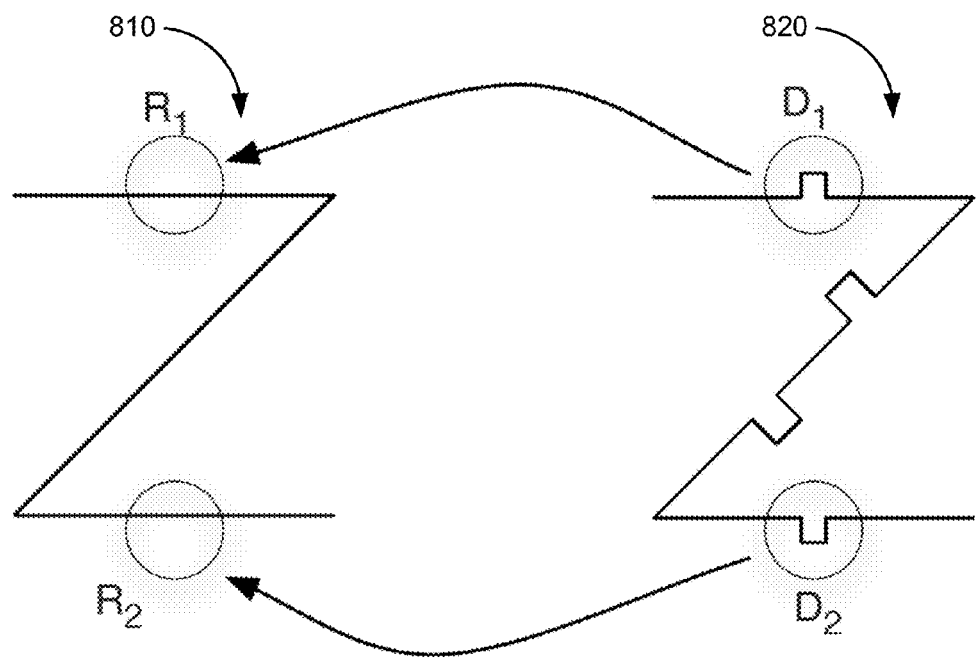
FIG. 9 illustrates how "local support" on a reference model can be used for each region of a driven model in one embodiment.

One common technique used to pair the motion of driven model 820 to reference model 810 can be to associate regions of driven model 820 to regions of reference model 810 based on their Euclidean distance. In general, such a spatial correspondence can include, very simply, where one puts both a driven and reference model in some default or "neutral pose" which are known to correspond, and then associates regions of the driven model with the region of the reference model they are closest to. This technique can be fairly accurate with simple geometry, such as that illustrated in FIGS. 8A-8D. FIG. 9A illustrates how "local support" on reference model 810 can be used for each region of driven model 820. For example, driven region D1 of driven model 820 may only affected by the positioning of region R1 associated with reference model 810. In another example, region D2 of driven model 820 may be completely uninfluenced by all portions of referenced model 810, excepting for region R2 of reference model 810.

Figure 9B:
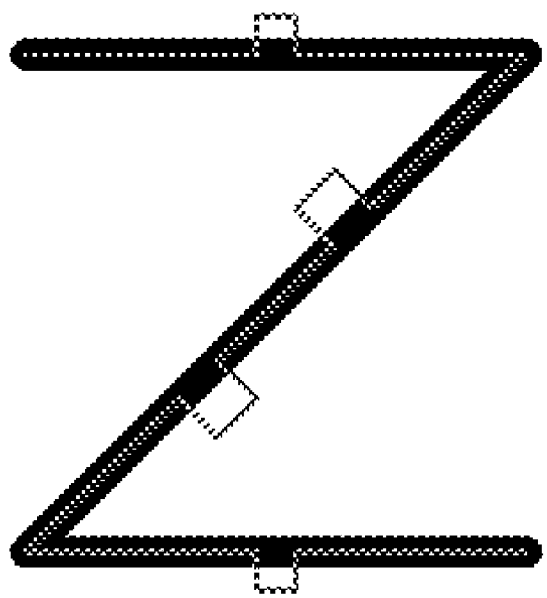

FIG. 9B depicts a simplified lower-resolution reference model 810 and a more complex driven model 820. In this example, reference model 810 is illustrated using a thickened line, for contrast. Driven model 820 is illustrated using a thinner line. Reference model 810 and driven model 820 are superimposed. In the absence of any predetermined correspondence between reference model 810 and driven model 820, such spatial correspondence is one common way of assigning each driven region a reference region to follow.

In various embodiments, interactive multi-mesh modeling system 200 provides that position of any given region of driven model 820 depends only on position of some small region of reference model 810. In other words, interactive multi-mesh modeling system 200 uses what is known as "local support" for determining exactly how each driven model region follows a corresponding region on a reference model. Interactive multi-mesh modeling system 200 can correctly determine, for each region of driven model 820, which region of reference model 810 (e.g., being an animated model) the driven region should be paying attention to.

Figure 10:
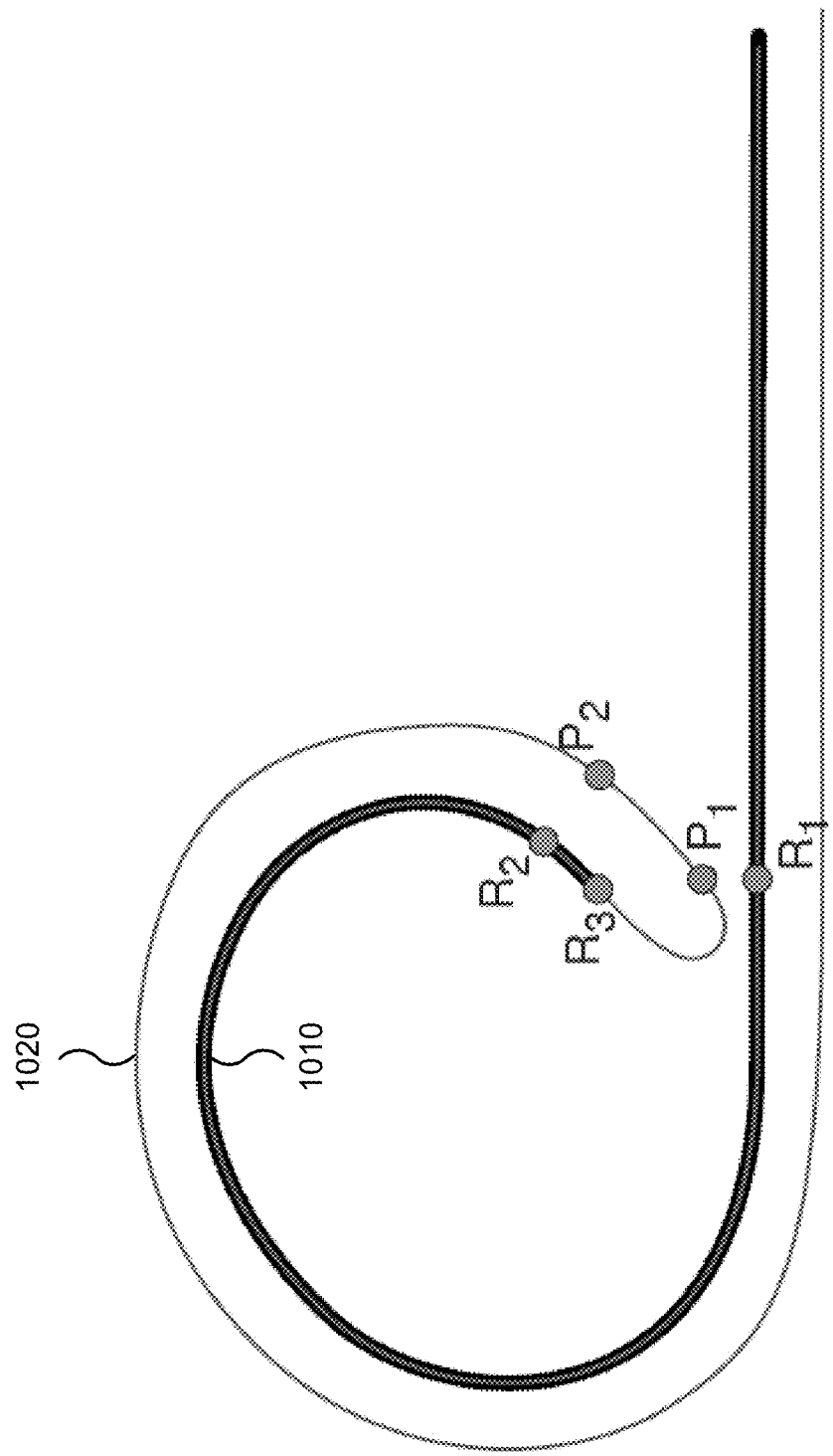
FIG. 10 depicts a simplified lower-resolution reference model and a more complex driven model in one embodiment.

FIG. 10 illustrates a simplified view of a reference model 1010 and a driven model 1020 in one embodiment. In this example, for simplicity and concreteness, discussion is made about specific points on reference model 1010 and reference model 1020 rather than surfaces, regions, or the like. A point marked P2 on driven model 1020 is closest to point R2 on reference model 1010 as determined by the metric (or metric function) of an embedding space. For example, the Euclidean distance between P2 and R2 is the least among Euclidean distances between P2 and other points on reference model 1010. Accordingly, interactive multi-mesh modeling system 200 may generate a mapping between P2 and R2 that provides that P2's motion will closely track R2's motion. However, using a similar simple spatial correspondence technique for point P1 on driven model 1020, the closest point is point R1 on reference model 1010 as determined by the metric (or metric function) of the embedding space. Yet, a mapping between P1 and R1 that provides that P1's motion will closely track R1's motion fails to provide correct results.

In another example, imagine that reference model 1010 is uncurled into a straight line. Thus, if P1's motion is determined to closely track R1's motion simply because it is close to R1, when reference model 1010 is uncurled driven model 1020 will certainly appear strangely posed relative to the desired pose of reference model 1010. Simply choosing a mapping based on minimum distance expressed through the metric of the embedding space clearly does not always give the correct answer. A more correct choice would be for P1 to track R3 instead. In this particular case, by expanding the neighborhood of possibilities determined through the metric of the embedded space, we can see that there are at least two plausible spatial correspondences for P1 between which to choose (e.g., points R1 and R3). Accordingly, interactive multi-mesh modeling system 200, in various embodiments, provides techniques for automatically disambiguating between elements in a neighborhood of possibilities determined through a metric of an embedded space.

Figure 11:
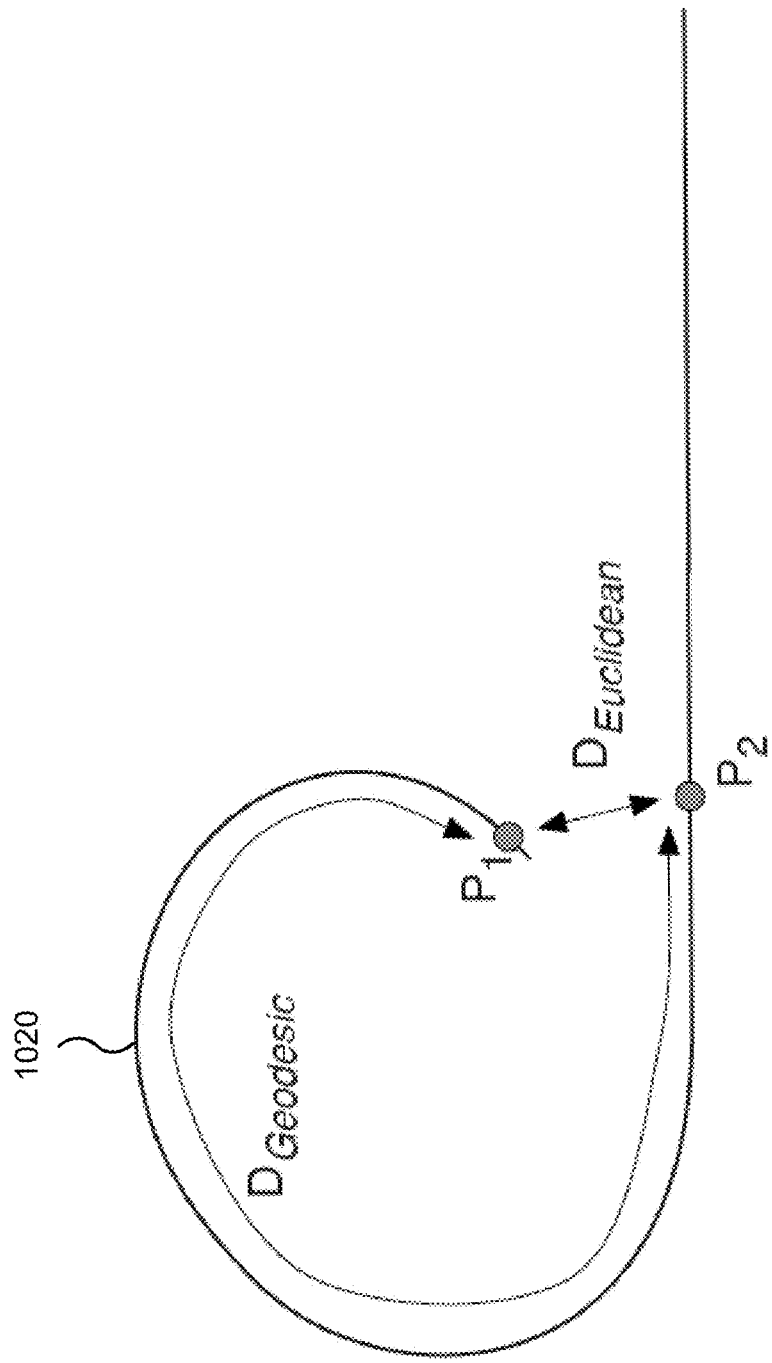
FIG. 11 illustrates a simplified view of the reference model of FIG. 10 in one embodiment.

FIG. 11 illustrates a simplified view of reference model 1010 of FIG. 10 in one embodiment. Consider points P1 and P2 on reference model 1010. The distance between points P1 and P2 can be measured more than one way. For example, a Euclidean distance ($D_{Euclidean}$) between points P1 and P2 can determined using a metric (or metric function) of an embedding space. This can result in simply a straight-line distance between points P1 and P2. In another example, a Geodesic distance ($D_{Geodesic}$) can be determined using a metric (or metric function) of reference model 1010 itself. This can result in the length of a shortest path between points P1 and P2 that stays on reference model 1010 (i.e., the path doesn't wander off reference model 1010 into free space of the embedding space).

Combining at least these two metrics (e.g., a Euclidean distance of en embedding space and a geodesic distance of reference model 1010) can provide important distinctions because intuitively, motion of reference model 1010 which changes only Euclidean distances between regions of reference model 1010 but leaves geodesic distances between regions of reference model 1010 the same should do the same to driven model 1020. When motion of reference model 1010 greatly distorts geodesic distances of driven model 1020, it can be reasonably inferred that driven model 1020 is not sensibly following reference model 1010.

Accordingly, referring again to FIG. 10, interactive multi-mesh modeling system 200 may apply this reasoning to disambiguate between points R1 and R3 by performing one or more tests to determine whether choosing to map point R1 to point P1 is a bad choice. This is because uncurling reference model 1010 essentially leaves any geodesic distance between points R1 and R2 unchanged as if reference model 1010 were uncurled. However, mapping R1 to P1 would cause the geodesic distance between points P1 and P2 on driven model 1020 to change drastically.

In various embodiments, interactive multi-mesh modeling system 200 may determine that P1 and P2 on driven model 1020 are initially close, geodesically, to one another. Interactive multi-mesh modeling system 200 may then determine to pick a pair of points on reference model 1010 that are similarly close, geodesically.

For example, if a point $P_k$ exists on driven model 1020 and a corresponding point $R_k$ exists on reference object 1010 that is a priori known to be a correct correspondence, interactive multi-mesh modeling system 200 can use this starting point to "grow" a correct correspondence between reference model 1010 and driven model 1020 outward from point $P_k$ exists on driven model 1020. Interactive multi-mesh modeling system 200 may determine a starting pair using several techniques. For example, interactive multi-mesh modeling system 200 may search for points on driven model 1020 that admit only a single, unambiguous correspondence to points on reference model 1010. In another example, interactive multi-mesh modeling system 200 may receive user input or other user direction to guide a starting point. In yet another example, interactive multi-mesh modeling system 200 may employ a knowledge-base to furnish a starting point.

Accordingly, given another point $P_n$ on driven model 1020, interactive multi-mesh modeling system 200 can choose a point $R_n$ on reference model 1010 based on a combination of the metrics of reference model 1010, driven model 1020, and an embedding space. If $P_n$ is geodesically near $P_k$ (a "neighboring" point) and if $P_n$ has multiple possible spatial correspondences on reference model 1010, interactive multi-mesh modeling system 200 can a point $R_n$ on reference model 1010 as a reference point for Pn such that the geodesic distance between $R_k$ and $R_n$ is similar to the geodesic distance between $P_k$ and $P_n$ rather than choose solely based on Euclidean distance. Said another way, if $P_k$ and $P_n$ have geodesic distance $d_1$ between them, and $R_k$ is already known to be a correct choice for $P_k$, interactive multi-mesh modeling system 200 can expect geodesic distance $d_2$ between $R_k$ and $R_n$ to be similar to $d_1$. In one example, the similarity may be no more than some constant factor c when evaluating ratios between the combined metrics.

Thus, in various embodiments, interactive multi-mesh modeling system 200 can correctly choose a reference point for $P_n$ through the combined metrics. Interactive multi-mesh modeling system 200 may then generate a complete correspondence between reference model 1010 and driven model 1020 starting from known or predetermined correspondences and expanding into neighboring regions. Continuing the previous example, given that interactive multi-mesh modeling system 200 now "knows" the correct reference point $R_n$ for $P_n$, interactive multi-mesh modeling system 200 can use $P_n$ and $R_n$ to help correctly find mappings from any unexplored points or regions of driven model 1020 to reference model 1010.

As discussed above, in various embodiments, interactive multi-mesh modeling system 200 allows a modeler to utilize solid 3D modeling tools to directly build and edit a complex or high resolution model (e.g., input mesh 210). As multi-resolution garment modeling system 200 may incorporate a variety of techniques that on demand or automatically reproduce or generate one or more additional models (e.g., output meshes 220) suitable for use in a variety of tasks (e.g., tasks 230), such as final rendering, animation, or simulation, interactive multi-mesh modeling system 200 can automatically generate correspondences between those models used as reference models and those models used as driven models.

Conclusion

Figure 12:
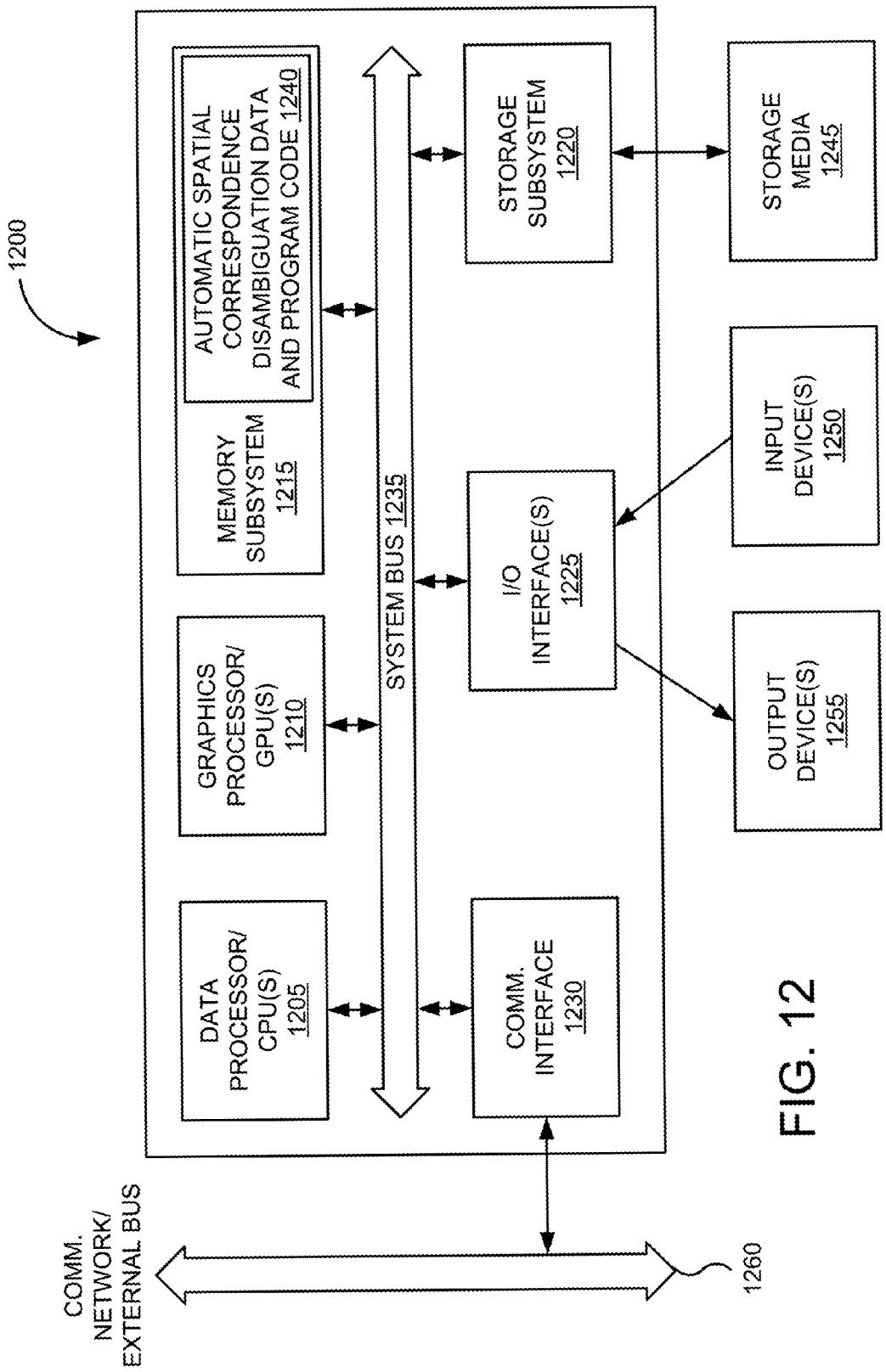
FIG. 12 is a block diagram of a computer system or information processing device that may be used to implement or practice various embodiments of an invention whose teachings may be presented herein.

FIG. 12 is a block diagram of computer system 1200 that may be used to implement or practice various embodiments of an invention whose teachings may be presented herein. FIG. 12 is merely illustrative of a computing device, general-purpose computer system programmed according to one or more disclosed techniques, or specific information processing device for an embodiment incorporating an invention whose teachings may be presented herein and does not limit the scope of the invention as recited in the claims. One of ordinary skill in the art would recognize other variations, modifications, and alternatives.

Computer system 1200 can include hardware and/or software elements configured for performing logic operations and calculations, input/output operations, machine communications, or the like. Computer system 1200 may include familiar computer components, such as one or more one or more data processors or central processing units (CPUs) 1205, one or more graphics processors or graphical processing units (GPUs) 1210, memory subsystem 1215, storage subsystem 1220, one or more input/output (I/O) interfaces 1225, communications interface 1230, or the like. Computer system 1200 can include system bus 1235 interconnecting the above components and providing functionality, such connectivity and inter-device communication. Computer system 1200 may be embodied as a computing device, such as a personal computer (PC), a workstation, a mini-computer, a mainframe, a cluster or farm of computing devices, a laptop, a notebook, a netbook, a PDA, a smartphone, a consumer electronic device, a gaming console, or the like.

The one or more data processors or central processing units (CPUs) 1205 can include hardware and/or software elements configured for executing logic or program code or for providing application-specific functionality. Some examples of CPU(s) 1205 can include one or more microprocessors (e.g., single core and multi-core) or micro-controllers, such as PENTIUM, ITANIUM, or CORE 2 processors from Intel of Santa Clara, Calif. and ATHLON, ATHLON XP, and OPTERON processors from Advanced Micro Devices of Sunnyvale, Calif. CPU(s) 1205 may also include one or more field-gate programmable arrays (FPGAs), application-specific integrated circuits (ASICs), or other microcontrollers. The one or more data processors or central processing units (CPUs) 1205 may include any number of registers, logic units, arithmetic units, caches, memory interfaces, or the like. The one or more data processors or central processing units (CPUs) 1205 may further be integrated, irremovably or moveably, into one or more motherboards or daughter boards.

The one or more graphics processor or graphical processing units (GPUs) 1210 can include hardware and/or software elements configured for executing logic or program code associated with graphics or for providing graphics-specific functionality. GPUs 1210 may include any conventional graphics processing unit, such as those provided by conventional video cards. Some examples of GPUs are commercially available from NVIDIA, ATI, and other vendors. In various embodiments, GPUs 1210 may include one or more vector or parallel processing units. These GPUs may be user programmable, and include hardware elements for encoding/ decoding specific types of data (e.g., video data) or for accelerating 2D or 3D drawing operations, texturing operations, shading operations, or the like. The one or more graphics processors or graphical processing units (GPUs) 1210 may include any number of registers, logic units, arithmetic units, caches, memory interfaces, or the like. The one or more data processors or central processing units (CPUs) 1205 may further be integrated, irremovably or moveably, into one or more motherboards or daughter boards that include dedicated video memories, frame buffers, or the like.

Memory subsystem 1215 can include hardware and/or software elements configured for storing information. Memory subsystem 1215 may store information using machine-readable articles, information storage devices, or computer-readable storage media. Some examples of these articles used by memory subsystem 1270 can include random access memories (RAM), read-only-memories (ROMS), volatile memories, non-volatile memories, and other semiconductor memories. In various embodiments, memory subsystem 1215 can include automatic spatial correspondence disambiguation data and program code 1240.

Storage subsystem 1220 can include hardware and/or software elements configured for storing information. Storage subsystem 1220 may store information using machine-readable articles, information storage devices, or computer-readable storage media. Storage subsystem 1220 may store information using storage media 1245. Some examples of storage media 1245 used by storage subsystem 1220 can include floppy disks, hard disks, optical storage media such as CD-ROMS, DVDs and bar codes, removable storage devices, networked storage devices, or the like. In some embodiments, all or part of automatic spatial correspondence disambiguation data and program code 1240 may be stored using storage subsystem 1220.

In various embodiments, computer system 1200 may include one or more hypervisors or operating systems, such as WINDOWS, WINDOWS NT, WINDOWS XP, VISTA, or the like from Microsoft or Redmond, Wash., SOLARIS from Sun Microsystems, LINUX, UNIX, and UNIX-based operating system. Computer system 1200 may also include one or more applications configured to executed, perform, or otherwise implement techniques disclosed herein. These applications may be embodied as automatic spatial correspondence disambiguation data and program code 1240. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 1215 and/or storage subsystem 1220.

The one or more input/output (I/O) interfaces 1225 can include hardware and/or software elements configured for performing I/O operations. One or more input devices 1250 and/or one or more output devices 1255 may be communicatively coupled to the one or more I/O interfaces 1225.

The one or more input devices 1250 can include hardware and/or software elements configured for receiving information from one or more sources for computer system 1200. Some examples of the one or more input devices 1250 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 1250 may allow a user of computer system 1200 to interact with one or more non-graphical or graphical user interfaces to enter a comment, select objects, icons, text, user interface widgets, or other user interface elements that appear on a monitor/display device via a command, a click of a button, or the like.

The one or more output devices 1255 can include hardware and/or software elements configured for outputting information to one or more destinations for computer system 1200. Some examples of the one or more output devices 1255 can include a printer, a fax, a feedback device for a mouse or joystick, external storage systems, a monitor or other display device, a communications interface appropriately configured as a transceiver, or the like. The one or more output devices 1255 may allow a user of computer system 1200 to view objects, icons, text, user interface widgets, or other user interface elements.

A display device or monitor may be used with computer system 1200 and can include hardware and/or software elements configured for displaying information. Some examples include familiar display devices, such as a television monitor, a cathode ray tube (CRT), a liquid crystal display (LCD), or the like.

Communications interface 1230 can include hardware and/or software elements configured for performing communications operations, including sending and receiving data. Some examples of communications interface 1230 may include a network communications interface, an external bus interface, an Ethernet card, a modem (telephone, satellite, cable, ISDN), (asynchronous) digital subscriber line (DSL) unit, FireWire interface, USB interface, or the like. For example, communications interface 1230 may be coupled to communications network/external bus 1280, such as a computer network, to a FireWire bus, a USB hub, or the like. In other embodiments, communications interface 1230 may be physically integrated as hardware on a motherboard or daughter board of computer system 1200, may be implemented as a software program, or the like, or may be implemented as a combination thereof.

In various embodiments, computer system 1200 may include software that enables communications over a network, such as a local area network or the Internet, using one or more communications protocols, such as the HTTP, TCP/IP, RTP/RTSP protocols, or the like. In some embodiments, other communications software and/or transfer protocols may also be used, for example IPX, UDP or the like, for communicating with hosts over the network or with a device directly connected to computer system 1200.

As suggested, FIG. 12 is merely representative of a general-purpose computer system appropriately configured or specific data processing device capable of implementing or incorporating various embodiments of an invention presented within this disclosure. Many other hardware and/or software configurations may be apparent to the skilled artisan which are suitable for use in implementing an invention presented within this disclosure or with various embodiments of an invention presented within this disclosure. For example, a computer system or data processing device may include desktop, portable, rack-mounted, or tablet configurations. Additionally, a computer system or information processing device may include a series of networked computers or clusters/grids of parallel processing devices. In still other embodiments, a computer system or information processing device may techniques described above as implemented upon a chip or an auxiliary processing board.

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

What is claimed is:

1. A method for generating correspondences between objects, the method comprising:
   receiving, at one or more computer systems, information specifying a first manifold endowed with a first metric, the first metric providing a first distance measure between at least two of a set of elements of the first manifold;
   receiving, at one or more computer systems, information specifying a second manifold endowed with a second metric, the second manifold being different from the first manifold, the second metric providing a second distance measure between at least two of a set of elements of the second manifold, the second distance measure being different from the first distance measure;
   receiving, at the one or more computer systems, information specifying an embedding space that includes the first manifold and the second manifold, the embedding space having a third metric different from the first metric and the second metric, the third metric providing a third distance measure between at least two of a set of elements in the embedding space;
   generating, with one or more processors associated with the one or more computer systems, information establishing a correspondence between the first manifold and the second manifold based on the first metric, the second metric, and the third metric, wherein a portion of the first manifold is selected to correspond to a portion of the second manifold from a plurality of potential correspondence candidates determined through the third metric of the embedding space; and
   storing information describing the correspondence between the first manifold and the second manifold in a storage device associated with the one or more computer systems.

2. The method of claim 1 wherein receiving the information specifying the first manifold or receiving the information specifying the second manifold comprises receiving information describing a 2D object.

3. The method of claim 1 wherein receiving the information specifying the embedding space that includes the first manifold and the second manifold comprises receiving information describing a 3D space.

4. The method of claim 1 wherein the first metric, the second metric, or the third metric are defined according to at least one of Euclidean distance, geodesic distance, or topological distance.

5. The method of claim 1 wherein generating the information establishing a correspondence between the first manifold and the second manifold based on the first metric, the second metric, and the third metric comprises:
   determining a plurality of points associated with a reference model representing the plurality of potential correspondence candidates for a point associated with a driven model based on the third metric associated with the embedding space;
   receiving a predetermined correspondence between at least one point associated with the reference model and at least one point associated with the driven model based on the second metric associated with the second manifold; and
   mapping at least one point in the plurality of points associated with the reference model to the point associated with the reference model based on the predetermined correspondence and the first metric.

6. The method of claim 1 wherein generating the information establishing a correspondence between the first manifold and the second manifold based on the first metric, the second metric, and the third metric comprises:
   receiving a known correspondence between at least one point associated with a reference model and at least one point associated with a driven model, the known correspondence satisfying metric criteria for the second metric; and
   determining a point associated with the reference model that corresponds to a point associated with the driven model based on the known correspondence and ratios associated with a plurality of points associated with the reference model between the first metric and the third metric.

7. The method of claim 1 wherein the first manifold or the second manifold represent part of a garment object.

8. A non-transitory computer-readable medium storing computer-executable code for generating correspondences between objects, the non-transitory computer-readable medium comprising:

code for receiving information specifying a first manifold endowed with a first metric, the first metric providing a first distance measure between at least two of a set of elements of the first manifold;

code for receiving information specifying a second manifold endowed with a second metric, the second manifold being different from the first manifold, the second metric providing a second distance measure between at least two of a set of elements of the second manifold, the second distance measure being different from the first distance measure;

code for receiving information specifying an embedding space that includes the first manifold and the second manifold, the embedding space having a third metric different from the first metric and the second metric, the third metric providing a third distance measure between at least two of a set of elements in the embedding space; and code for generating information establishing a correspondence between the first manifold and the second manifold based on the first metric, the second metric, and the third metric, wherein a portion of the first manifold is selected to correspond to a portion of the second manifold from a plurality of potential correspondence candidates determined through the third metric of the embedding space.

9. The non-transitory computer-readable medium of claim 8 wherein the code for receiving the information specifying the first manifold or receiving the information specifying the second manifold comprises code for receiving information describing a 2D object.

10. The non-transitory computer-readable medium of claim 8 wherein the code for receiving the information specifying the embedding space that includes the first manifold and the second manifold comprises code for receiving information describing a 3D space.

11. The non-transitory computer-readable medium of claim 8 wherein the first metric, the second metric, or the third metric are defined according to at least one of Euclidean distance, geodesic distance, or topological distance.

12. The non-transitory computer-readable medium of claim 8 wherein the code for generating the information establishing a correspondence between the first manifold and the second manifold based on the first metric, the second metric, and the third metric comprises:

code for determining a plurality of points associated with a reference model representing the plurality of potential correspondence candidates for a point associated with a driven model based on the third metric associated with the embedding space;

code for receiving a predetermined correspondence between at least one point associated with the reference model and at least one point associated with the driven model based on the second metric associated with the second manifold; and code for mapping at least one point in the plurality of points associated with the reference model to the point associated with the reference model based on the predetermined correspondence and the first metric.

13. The non-transitory computer-readable medium of claim 8 wherein the code for generating the information establishing a correspondence between the first manifold and the second manifold based on the first metric, the second metric, and the third metric comprises:

code for receiving a known correspondence between at least one point associated with a reference model and at least one point associated with a driven model, the known correspondence satisfying metric criteria for the second metric; and code for determining a point associated with the reference model that corresponds to a point associated with the driven model based on the known correspondence and ratios associated with a plurality of points associated with the reference model between the first metric and the third metric.

14. The non-transitory computer-readable medium of claim 8 wherein the first manifold or the second manifold represent part of a garment object.

15. A system for generating correspondences between objects, the system comprising:

a processor; and a memory in communication with the processor and configured to store a set of instructions which configure the processor to:

receive information specifying a first manifold endowed with a first metric, the first metric providing a first distance measure between at least two of a set of elements of the first manifold;

receive information specifying a second manifold endowed with a second metric, the second manifold being different from the first manifold, the second metric providing a second distance measure between at least two of a set of elements of the second manifold, the second distance measure being different from the first distance measure;

receive information specifying an embedding space that includes the first manifold and the second manifold, the embedding space having a third metric different from the first metric and the second metric, the third metric providing a third distance measure between at least two of a set of elements in the embedding space; and generate information establishing a correspondence between the first manifold and the second manifold based on the first metric, the second metric, and the third metric, wherein a portion of the first manifold is selected to correspond to a portion of the second manifold from a plurality of potential correspondence candidates determined through the third metric of the embedding space.

16. The system of claim 15 wherein to receive the information specifying the first manifold or receiving the information specifying the second manifold the processor is configured to receive information describing a 2D object.

17. The system of claim 15 wherein to receive the information specifying the embedding space that includes the first manifold and the second manifold the processor is configured to receive information describing a 3D space.

18. The system of claim 15 wherein the first metric, the second metric, or the third metric are defined according to at least one of Euclidean distance, geodesic distance, or topological distance.

19. The system of claim 15 wherein to generate the information establishing a correspondence between the first manifold and the second manifold based on the first metric, the second metric, and the third metric the processor is configured to:

determine a plurality of points associated with a reference model representing the plurality of potential correspondence candidates for a point associated with a driven model based on the third metric associated with the embedding space;

receive a predetermined correspondence between at least one point associated with the reference model and at least one point associated with the driven model based on the second metric associated with the second manifold; and map at least one point in the plurality of points associated with the reference model to the point associated with the reference model based on the predetermined correspondence and the first metric.

20. The system of claim 15 wherein to generate the information establishing a correspondence between the first manifold and the second manifold based on the first metric, the second metric, and the third metric the processor is configured to:

receive a known correspondence between at least one point associated with a reference model and at least one point associated with a driven model, the known correspondence satisfying metric criteria for the second metric; and determine a point associated with the reference model that corresponds to a point associated with the driven model based on the known correspondence and ratios associated with a plurality of points associated with the reference model between the first metric and the third metric.

21. The system of claim 15 wherein the first manifold or the second manifold represent part of a garment object.

* * * * *